(12) United States Patent
Watanabe et al.

(10) Patent No.: US 7,667,578 B2
(45) Date of Patent: Feb. 23, 2010

(54) REMOTE OPERATION CONTROL DEVICE AND REMOTE OPERATION CONTROL METHOD

(75) Inventors: Atsushi Watanabe, Anjo (JP); Naoki Taki, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 327 days.

(21) Appl. No.: 11/628,643

(22) PCT Filed: Sep. 14, 2005

(86) PCT No.: PCT/JP2005/017333

§ 371 (c)(1),
(2), (4) Date: Dec. 6, 2006

(87) PCT Pub. No.: WO2006/033332

PCT Pub. Date: Mar. 30, 2006

(65) Prior Publication Data

US 2008/0048844 A1   Feb. 28, 2008

(30) Foreign Application Priority Data

Sep. 22, 2004   (JP)   ............................. 2004-275198

(51) Int. Cl.
*B60Q 1/00* (2006.01)
(52) U.S. Cl. ............... 340/425.5; 123/179.1; 123/179.2; 123/179.3

(58) Field of Classification Search ... 340/572.1–572.9, 340/425.5, 5.28, 5.21, 5.33, 5.5, 5.61; 123/179.1, 123/179.2, 179.3
See application file for complete search history.

(56) References Cited

U.S. PATENT DOCUMENTS 5,555,863 A * 9/1996 Kokubu ................... 123/179.3
6,130,622 A * 10/2000 Hussey et al. .............. 340/5.61

(Continued)

FOREIGN PATENT DOCUMENTS

DE   102 25 787 A1   12/2003

(Continued)

*Primary Examiner*—Davetta W Goins
*Assistant Examiner*—Edny Labbees
(74) *Attorney, Agent, or Firm*—Oliff & Berridge, PLC

(57) ABSTRACT

In a remote operation control device, an in-vehicle communication unit receives a drive request signal which is transmitted from a center to request a remote operation of a predetermined in-vehicle apparatus. When the drive request signal from the center is received by the in-vehicle communication unit, a preliminary checking request unit requests an in-vehicle electronic control unit which controls operation of the in-vehicle apparatus, to perform checking of whether a precondition for carrying out the remote operation of the in-vehicle apparatus is satisfied. A remote driving unit carries out the remote operation of the in-vehicle apparatus when it is determined after the drive request signal from the center is received by the in-vehicle communication unit that the precondition is satisfied as a result of response to the request for the checking by the preliminary checking request unit.

18 Claims, 7 Drawing Sheets

U.S. PATENT DOCUMENTS

| | | |
|---|---|---|
| 2001/0020893 A1 | 9/2001 | Kawai et al. |
| 2001/0040503 A1* | 11/2001 | Bishop ........................ 340/426 |
| 2002/0113686 A1* | 8/2002 | Shannon Carravallah .. 340/5.61 |
| 2002/0140545 A1* | 10/2002 | Nietupski et al. .......... 340/5.72 |
| 2003/0043019 A1* | 3/2003 | Tanaka et al. ............... 340/5.64 |
| 2003/0151501 A1* | 8/2003 | Teckchandani et al. 340/426.19 |
| 2006/0125610 A1* | 6/2006 | Lemoult .................. 340/426.1 |
| 2008/0266051 A1* | 10/2008 | Taki et al. .................... 340/5.1 |

FOREIGN PATENT DOCUMENTS

| | | |
|---|---|---|
| EP | 1 136 953 A2 | 9/2001 |
| JP | A 62-129479 | 6/1987 |
| JP | A 2003-013645 | 1/2003 |
| JP | A2003-296860 | 10/2003 |
| JP | A 2004-184106 | 7/2004 |

* cited by examiner

REMOTE OPERATION CONTROL DEVICE AND REMOTE OPERATION CONTROL METHOD

TECHNICAL FIELD

The present invention relates to a remote operation control device and a remote operation control method, and more particularly to a remote operation control device and a remote operation control method which are appropriate for carrying out a remote driving operation of a predetermined in-vehicle apparatus according to a drive request from a center.

BACKGROUND ART

Conventionally, a remote operation control system is known. This remote operation control system is comprised of controlled devices, such as a vehicle and an in-vehicle apparatus, a center, and a portable terminal carried by the user. In accordance with the user's input operation on the portable terminal, the remote operation control system establishes connection of the portable terminal, the center, and the controlled devices through a network, and the controlled devices at a remote place are operated by a remote control. For example, see Japanese Laid-Open Patent Application No. 2003-296860.

In the above-mentioned system, if the contents of remote operation of the controlled devices are specified by the user on the portable terminal, those specified contents of remote operation are transmitted from the portable terminal to the center through the network connection, and the contents of remote operation are transmitted from the center to the controlled devices through the network connection And the controlled devices are remotely driven according to the transmitted contents of remote operation.

By the way, the operation of the portable terminal is performed, in order to carry out the remote operation of the controlled devices, by the user at a remote place where the user cannot visually recognize the vehicle. In many cases, the user has not grasped exactly whether the vehicle is in a suitable state for performing the remote operation of the controlled devices. If the remote operation of the controlled devices is actually performed when the vehicle is not in a suitable state, a problem impairing the safety of the vehicle may arise.

In this respect, in the above-mentioned system, the checking as to whether the vehicle is in a suitable state for performing the remote operation when performing remote operation of the controlled devices is not taken into consideration. For this reason, the above-mentioned system has a possibility that the problem impairing the safety of the vehicle may arise.

DISCLOSURE OF THE INVENTION

A general object of the present invention is to provide a remote operation control device and method in which the above-mentioned problems are eliminated.

A more specific object of the present invention is to provide a remote operation control device and method which is able to increase the safety of the vehicle with respect to remote operation of the in-vehicle apparatus.

In order to achieve the above-mentioned objects, the present invention provides a remote operation control device comprising: an in-vehicle communication unit receiving a drive request signal which is transmitted from a center to request a remote operation of a predetermined in-vehicle apparatus; a preliminary checking request unit requesting, when the drive request signal from the center is received by the in-vehicle communication unit, an in-vehicle electronic control unit which controls operation of the in-vehicle apparatus, to perform checking of whether a precondition for carrying out the remote operation of the in-vehicle apparatus is satisfied; and a remote driving unit carrying out the remote operation of the in-vehicle apparatus when it is determined, after the drive request signal from the center is received by the in-vehicle communication unit, that the precondition is satisfied as a result of response to the request for the checking by the preliminary checking request unit.

In order to achieve the above-mentioned objects, the present invention provides a remote operation control method comprising the steps of: receiving a drive request signal which is transmitted from a center to request a remote operation of a predetermined in-vehicle apparatus; requesting, when the drive request signal from the center is received in the receiving step, an in-vehicle electronic control unit which controls operation of the in-vehicle apparatus, to perform checking of whether a precondition for carrying out the remote operation of the in-vehicle apparatus is satisfied; and carrying out the remote operation of the in-vehicle apparatus when it is determined, after the drive request signal from the center is received in the receiving step, that the precondition is satisfied as a result of response to the request for the checking in the requesting step.

According to the above-mentioned remote operation control device and method of the invention, a remote operation of a predetermined in-vehicle apparatus is performed when checking of whether a precondition for carrying out the remote operation is satisfied is requested by an in-vehicle electronic control unit controlling operation of the in-vehicle apparatus and then it is determined that the precondition is satisfied as a result of response to the request. Therefore, the remote operation of the in-vehicle apparatus is never performed when a drive request signal from a center is received but the vehicle is not in a suitable state for performing the remote operation of the in-vehicle apparatus. Accordingly, it is possible to raise the safety of the vehicle with respect to remote operation of in-vehicle apparatus.

Furthermore, in order to achieve the above-mentioned objects, the present invention provides a remote operation control device comprising: an in-vehicle communication unit receiving a drive request signal which is transmitted from a center to request a remote operation of a predetermined in-vehicle apparatus; a compulsive operation request unit requesting, when the drive request signal from the center is received by the in-vehicle communication unit, an in-vehicle electronic control unit which controls operation of the in-vehicle apparatus to perform an operation needed to satisfy a precondition for carrying out the remote operation of the in-vehicle apparatus; and a remote driving unit carrying out the remote operation of the in-vehicle apparatus when it is determined, after the drive request signal from the center is received by the in-vehicle communication unit, that the precondition is satisfied as a result of response to the request for the operation by the compulsive operation request unit.

Furthermore, in order to achieve the above-mentioned objects, the present invention provides a remote operation control method comprising the steps of: receiving a drive request signal which is transmitted from a center to request a remote operation of a predetermined in-vehicle apparatus; requesting, when the drive request signal from the center is received in the receiving step, an in-vehicle electronic control unit which controls operation of the in-vehicle apparatus to perform an operation needed to satisfy a precondition for carrying out the remote operation of the in-vehicle apparatus;

and carrying out the remote operation of the in-vehicle apparatus when it is determined, after the drive request signal from the center is received in the receiving step, that the precondition is satisfied as a result of response to the request for the operation in the requesting step.

According to the above-mentioned remote operation control device and method of the invention, a remote operation of a predetermined in-vehicle apparatus is performed when an operation needed to satisfy a precondition for carrying out the remote operation is requested by an in-vehicle electronic control unit controlling operation of the in-vehicle apparatus and then it is determined that the precondition is satisfied as a result of response to the request. Therefore, the remote operation of the in-vehicle apparatus is never performed when a drive request signal from a center is received but the vehicle is not in a suitable state for performing the remote operation of the in-vehicle apparatus. Accordingly, it is possible to raise the safety of the vehicle with respect to remote operation of in-vehicle apparatus.

According to the present invention, the safety of the vehicle with respect to remote operation of in-vehicle apparatus can be raised.

BEST MODE FOR CARRYING OUT THE INVENTION

A description will now be given of an embodiment of the invention with reference to the accompanying drawings.

Figure 1:
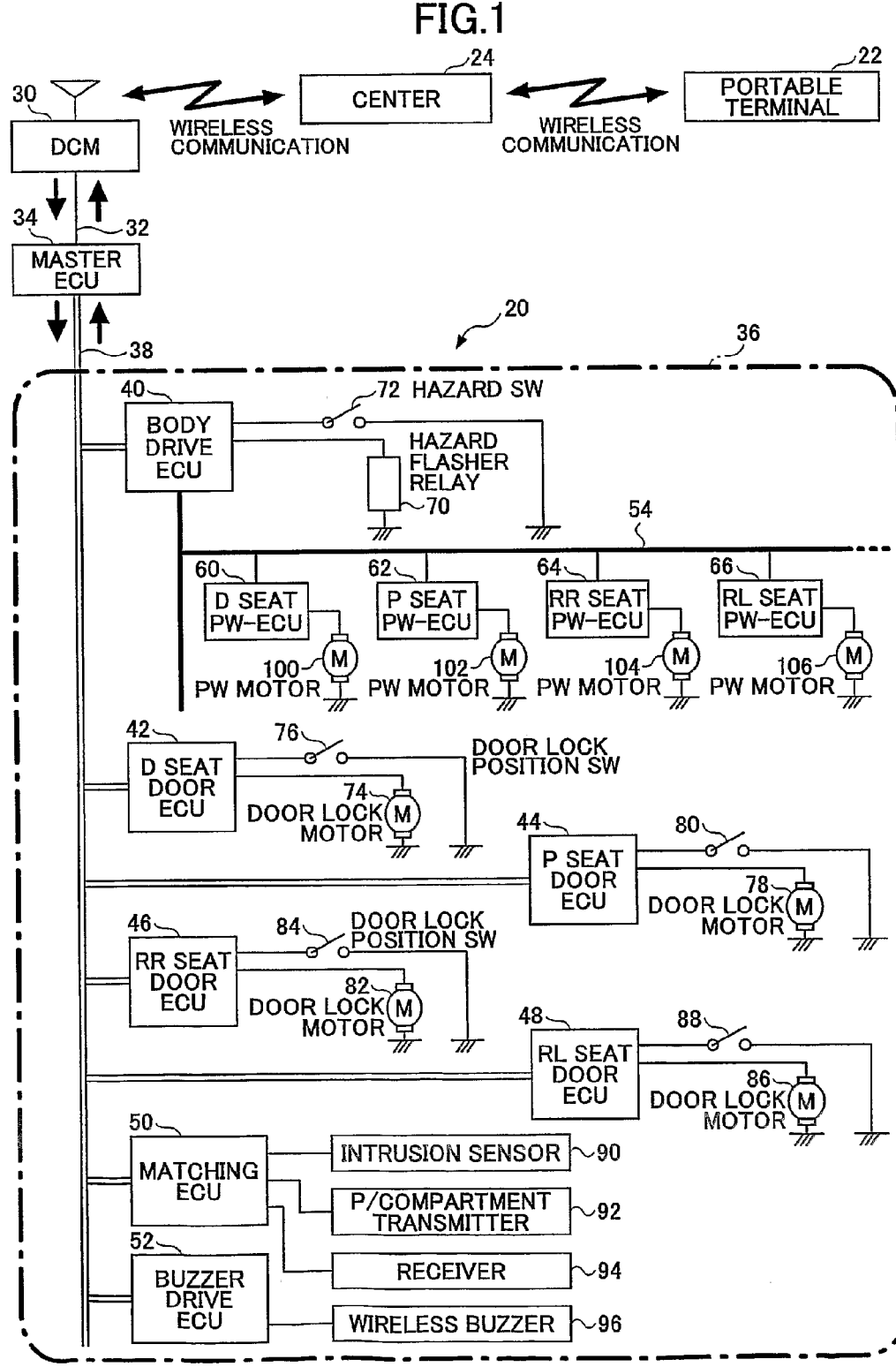
FIG. 1 is a block diagram showing the composition of a remote operation control system in an embodiment of the invention.

FIG. 1 shows the composition of a remote operation control system in an embodiment of the invention.

The remote operation control system of this embodiment comprises an in-vehicle apparatus 20 which is carried in a vehicle, a portable terminal 22 which is any of a cellular phone, a personal computer or a PDA carried and possessed by a regular vehicle user, such as a vehicle driver or owner, and a center 24 which manages information exchanged between the in-vehicle apparatus 20 and the portable terminal 22 via a wireless communication. Examples of the in-vehicle apparatus 20 may include turn signal lamps, doors, power windows, etc of the vehicle.

The remote operation control system of this embodiment is specifically designed for the vehicle user who gets off from the vehicle to perform directly a drive operation of the in-vehicle apparatus (for example, blinking and turning off of turn signal lamps, locking and unlocking of doors, opening and closing of power windows, etc.) or perform remotely the drive operation of the in-vehicle apparatus through communication via the center 24.

In the present specification, the term "local operation" means that the vehicle user directly operates the above-mentioned in-vehicle apparatus (including a wireless operation by the wireless communication of the vehicle and the vehicle key, while the term "remote operation" means that the remote operation control system of this embodiment remotely operates the above-mentioned in-vehicle apparatus through the center 24.

The in-vehicle apparatus 20 is provided with a data communication module (DCM) 30 which is capable of performing wireless communication with the center 24 through a predetermined communication network, and provided with a master electronic control unit (master ECU) 34 which is constituted by a computer connected to DCM 30 via the communication line 32.

DCM 30 has a clock function of measuring time and a function of transmitting information related to the in-vehicle apparatus 20 to the center 24 via the communication network. DCM 30 further has a function of receiving the information sent by the center 24 via the communication network.

Master ECU 34 operates according to the software program which is beforehand stored in its memory storage, such as ROM. Master ECU 34 has a memory storage which stores the identification information of the vehicle containing the telephone number of the vehicle, and the telephone number of the center 24 etc. The transmission data is exchanged between master ECU 34 and DCM 30 through the communication line 32.

The in-vehicle apparatus 20 is further provided with the controlled ECU group 36 which comprises various kinds of electronic control units (slave ECUs) which are in a rank lower than the above-mentioned master ECU 34.

These slave ECUs are electronic control units which control the in-vehicle apparatuses to which the local operation can be performed by the vehicle user, and perform detection of intrusion of a person into the vehicle, and control the sounding of a wireless buzzer.

Master ECU 34 is capable of requesting each slave ECU of the controlled ECU group 36 to perform predetermined processing. Master ECU 34 has a table which specifies a combination of the in-vehicle apparatus for carrying out the remote operation and the slave ECU of the controlled ECU group 36 provided for the checking of whether the precondition is satisfied.

It is possible that the slave ECU provided for the checking of whether this precondition is satisfied differs from the slave ECU which carries out the remote operation of the corresponding in-vehicle apparatus. Also, it is possible that two or more slave ECUs are provided to carry out the remote operation of one in-vehicle apparatus.

As shown in FIG. 1, the controlled ECU group 36 comprises the slave ECUs which are connected with master ECU 34 via the first bus 38, including body drive ECU 40, driver-seat-side door ECU (D seat door ECU) 42, front-passenger-seat-side door ECU (P seat door ECU) 44, rear-right-seat-side door ECU (RR seat door ECU) 46, rear-left-seat-side door ECU (RL seat door ECU) 48, matching ECU 50 for key matching, and buzzer drive ECU 52. The controlled ECU group 36 further comprises the slave ECUs which are connected with the above-mentioned body drive ECU 40 via the second bus 54, including driver-seat-side power window ECU (D seat PW-ECU) 60, front-passenger-seat-side power window ECU (P seat PW-ECU) 62, rear-right-seat-side power window ECU (RR seat PW-ECU) 64, and rear-left-seat-side power window ECU (RL seat PW-ECU) 66.

Body drive ECU 40 has a gateway function which enables the two-way communication with the slave ECUs on the side of the first bus 38 and with the slave ECUs on the side of the second bus 54. It is possible that the first bus 38 and the second bus 54 differ in the speed of transmission of information.

If a remote operation of the in-vehicle apparatus (for example, locking and unlocking of a door, lighting or turning off of a turn signal lamp, opening and closing of a power window) is requested from the center 24, master ECU 34 determines whether the precondition for carrying out the remote operation is satisfied, as will be explained later, and only when the precondition is satisfied, master ECU 34 outputs the operation demand signal which requesting the remote operation to body drive ECU 40 via the first bus 38.

Body drive ECU 40 outputs the operation command signal to the ECU and the relay which carry out the remote operation, when the operation demand signal related to the remote operation of the in-vehicle apparatus supplied from master ECU 34 is received.

Hazard flasher relay 70 which blinks the turn signal lamps provided at the front, the rear and the side of the vehicle body, and hazard switch 72 which outputs the signal according to the blinking of the turn signal lamp are connected to body drive ECU 40.

When ON operation of the switch for making right-and-left coincidence blinking of turn signal lamps which is disposed in the instrument panel and operational by the vehicle crew member is performed, or when the operation demand from master ECU 34 is received (which will be described later), body drive ECU 40 turns ON the hazard flasher relay 70 in order to make right-and-left coincidence blinking of the turn signal lamps.

Hazard switch 72 supplies the signal which indicates the blinking of turn signal lamps to body drive ECU 40. Body drive ECU 40 detects blinking or turning off of the turn signal lamps based on the state of hazard switch 72.

Door lock motor 74 which changes the lock position of D seat door, and door lock position switch 76 which outputs the signal according to the lock position (namely, locking and unlocking) of D seat door are connected to D seat door ECU 42.

When the vehicle key is inserted in the key cylinder and operated by the vehicle crew member, or when locking/releasing button provided in the vehicle key is pushed by the vehicle crew member and the wireless communication between the vehicle and the vehicle key is checked, or when the vehicle crew member carrying the vehicle key approaches the vehicle or the predetermined switch disposed in D seat doorknob is pushed and the wireless communication between the vehicle and the vehicle key is checked, or when the operation demand from master ECU 34 is received, D seat door ECU 42 supplies a command signal to door lock motor 74 in order to change the lock position of D seat door between locking and unlocking.

The output signal of door lock position switch 76 is supplied to D seat door ECU 42. D seat door ECU 42 detects the lock position of D seat door based on the state of door lock position switch 76. D seat door ECU 42 detects the open/closed condition of D seat door based on the state of the courtesy lamp switch of D seat door.

Similarly, door lock motor 78 which changes the lock position of P seat door, and door lock position switch 80 which outputs the signal according to the lock position of P seat door are connected to P seat door ECU 44.

When the vehicle key is inserted in the key cylinder and operated by the vehicle crew member, or when locking/releasing button provided in the vehicle key is pushed by the vehicle crew member and the wireless communication between the vehicle and the vehicle key is checked, or when the vehicle crew member carrying the vehicle key approaches the vehicle or the predetermined switch disposed in D seat doorknob is pushed and the wireless communication between the vehicle and the vehicle key is checked, or when the operation demand from master ECU 34 is received, P seat door ECU 42 supplies a command signal to door lock motor 78 in order to change the lock position of P seat door between locking and unlocking.

The output signal of door lock position switch 80 is supplied to P seat door ECU 44. P seat door ECU 44 detects the lock position of P seat door based on the state of door lock position switch 80. P seat door ECU 44 detects the open/closed condition of P seat door based on the state of the courtesy lamp switch of P seat door.

Door lock motor 82 which changes the lock position of RR seat door, and door lock position switch 84 which outputs the signal according to the lock position of RR seat door are connected to RR seat door ECU 46.

When the vehicle key is inserted in the key cylinder and operated by the vehicle crew member, or when locking/releasing button provided in the vehicle key is pushed by the vehicle crew member and the wireless communication between the vehicle and the vehicle key is checked, or when the vehicle crew member carrying the vehicle key approaches the vehicle or the predetermined switch disposed in D seat doorknob is pushed and the wireless communication between the vehicle and the vehicle key is checked, or when the operation demand from master ECU 34 is received, RR seat door ECU 46 supplies a command signal to door lock motor 82 in order to change the lock position of RR seat door between locking and unlocking.

The output signal of door lock position switch 84 is supplied to RR seat door ECU 46. RR seat door ECU 46 detects the lock position of RR seat door based on the state of door lock position switch 84. RR seat door ECU 46 detects the open/closed condition of RR seat door based on the state of the courtesy lamp switch of RR seat door.

Door lock motor 86 which changes the lock position of RL seat door, and door lock position switch 88 which outputs the signal according to the lock position of RL seat door are connected to RL seat door ECU 48.

When the vehicle key is inserted in the key cylinder and operated by the vehicle crew member, or when the locking/releasing button provided in the vehicle key is pushed by the vehicle crew member and the wireless communication between the vehicle and the vehicle key is checked, or when the vehicle crew member carrying the vehicle key approaches the vehicle or the predetermined switch disposed in D seat doorknob is pushed and the wireless communication between the vehicle and the vehicle key is checked, or when the operation demand from master ECU 34 is received, RL seat door ECU 48 supplies a command signal to door lock motor 86 in order to change the lock position of RL seat door between locking and unlocking.

The output signal of door lock position switch 88 is supplied to RL seat door ECU 48. RL seat door ECU 48 detects the lock position of RL seat door based on the state of door lock position switch 88. RL seat door ECU 48 detects the open/closed condition of RL seat door based on the state of the courtesy lamp switch of RL seat door.

Intrusion sensor 90 is connected to matching ECU 50. Intrusion sensor 90 may be any of a camera which is disposed in the passenger compartment and photos the inside of the passenger compartment, a sensing sensor which detects an object using an electric wave, an ultrasonic wave, infrared radiation, etc., a load sensor which detects the load added to the vehicle sheet, etc. Intrusion sensor 90 outputs the signal according to the existence of a person in the passenger compartment to matching ECU 50 under the situation in which the detection is enabled by the driving command from matching ECU 50.

Matching ECU 50 can control intrusion sensor 90 in the state in which the detection is enabled. When the driving command is sent to intrusion sensor 90, matching ECU 50 detects the existence of a person in the passenger compartment based on the output signal of the intrusion sensor 90.

Matching ECU 50 produces a security alarm if it detects that any person exists in the passenger compartment in the situation in which the detection of the intrusion sensor 90 is enabled in the security mode.

Transmitter 92 in the passenger compartment and receiver 94 are connected to matching ECU 50. Transmitter 92 in the passenger compartment has a function which transmits the request signal which requests the response of the vehicle key which the vehicle crew member carries towards the inside of the passenger compartment.

Receiver 94 has the function to receive the response signals which are sent by the vehicle key in response to the request signal sent by transmitter 92 in the passenger compartment.

When matching ECU 50 should detect existence of a vehicle key in the passenger compartment under the situation where the checking in the passenger compartment of the vehicle key is permitted by the vehicle crew member's setting operation, matching ECU 50 causes transmitter 92 in the passenger compartment to send a request signal. After this request is sent, matching ECU 50 detects the existence of the vehicle key in the passenger compartment based on the existence of a response signal received by receiver 94.

Wireless buzzer 96 carried in the vehicle is connected to buzzer drive ECU 52. When buzzer drive ECU 52 should call by the sounding the attention of persons who are located in the passenger compartment and persons near the doors or windows of the vehicle, buzzer drive ECU 52 operates wireless buzzer 96. If needed, buzzer drive ECU 52 is capable of changing the way wireless buzzer 96 outputs the sounding.

PW motor 100 which opens and closes the power window of D seat door is connected to D seat PW-ECU 60. D seat PW-ECU 60 supplies a command signal to PW motor 100 so that the power window of D seat door is opened or closed, when ON operation of the open/close switch disposed in D seat is done by the vehicle crew member, or when the operation demand from master ECU 34 is received which will be explained in detail later.

PW motor 100 makes the power window of D seat door open or closed according to the command signal supplied from D seat PW-ECU 60. D seat PW-ECU 60 has a function which detects the open/closed condition (including the open or closed state, and the opening position in case of the open state) of the power window of D seat door based on the state of PW motor 100.

Similarly, PW motor 102 which opens and closes the power window of P seat door is connected to P seat PW-ECU 62. When ON operation of the open/close switch allocated in the open/close switch or P seat for P seat where P seat PW-ECU 62 is allocated in D seat is done by the vehicle crew member, or when the operation demand from master ECU 34 is made, a command signal is supplied to PW motor 102 that the power window of P seat door should be opened and closed.

PW motor 102 makes the power window of P seat door open or closed according to the command signal supplied from P seat PW-ECU 62. P seat PW-ECU 62 has a function which detects the open/closed condition (including the open or closed state, and the opening position in case of the open state) of the power window of P seat door based on the state of PW motor 102.

PW motor 104 which opens and closes the power window of RR seat door is connected to RR seat PW-ECU 64. When ON operation of the open/close switch allocated in the open/close switch or RR seat for RR seats where RR seat PW-ECU 64 is allocated in D seat is done by the vehicle crew member, or when the operation demand from master ECU 34 is made, a command signal is supplied to PW motor 104 that the power window of RR seat door should be opened and closed.

PW motor 104 makes the power window of RR seat door open or closed according to the command signal supplied from RR seat PW-ECU 64. RR seat PW-ECU 64 has a function which detects the open/closed condition (including the open or closed state, and the opening position in case of the open state) of the power window of RR seat door based on the state of PW motor 104.

PW motor 106 which opens and closes the power window of RL seat door is connected to RL seat PW-ECU 66. When ON operation of the open/close switch allocated in the open/close switch or RL seat for RL seats where RL seat PW-ECU 66 is allocated in D seat is done by the vehicle crew member, or when the operation demand from master ECU 34 is made, a command signal is supplied to PW motor 106 that the power window of RL seat door should be opened and closed.

PW motor 106 makes the power window of RL seat door open and close according to the command signal supplied from RL seat PW-ECU 66. RL seat PW-ECU 66 has a function which detects the open/closed condition (including the open or closed state, and the opening position in case of the open state) of the power window of RL seat door based on the state of PW motor 106.

The portable terminal 22 operates according to the software program beforehand stored in the memory storage, such as ROM. The portable terminal 22 has a memory storage which stores the identification information containing the telephone number of the vehicle corresponding to the portable terminal 22, the e-mail address and the telephone number of the portable terminal 22, and the telephone number of the above-mentioned center 24 etc. The portable terminal 22 is able to perform wireless communication with the center 24 through the communication network.

The portable terminal 22 has a function which transmits its own information to the center 24 via a communication network, and has a function which receives the information transmitted from the center 24 via the communication network.

The portable terminal 22 has the input/output section which receives manual input operation done by the vehicle user and performs a voice output and a display output to the vehicle user.

The portable terminal 22 has a web browser, and can acquire the web screen for requiring the remote operation of the information, for example, in-vehicle apparatus, which the center 24 offers.

The portable terminal 22 is capable of sending to an external web server the contents which are inputted into the input output section by the vehicle user, and capable of viewing the file and data which are stored in the external web server via the communication network by the alter operation to the input output section.

The center 24 is provided with the mass database which stores customer data, such as identification information of the regular user of the vehicle which are a host computer in which high speed operation is possible, and a user using the center 24, an e-mail address of portable terminal 22, the telephone number, and identification information of the vehicle, the telephone number.

The center 24 operates according to the software program beforehand stored in the memory storage, such as ROM. The center 24 is able to communicate with the in-vehicle apparatus 20 and the portable terminal 22 by wireless communication via the communication network.

The center 24 has the function to receive the information transmitted via the communication network from the function which transmits its own information to in-vehicle apparatus 20 and portable terminal 22 via the communication network, in-vehicle apparatus 20, and portable terminal 22 in the center 24.

The center 24 provides the web screen for requiring the remote operation of various in-vehicle apparatuses to portable terminal 22.

Figure 2:
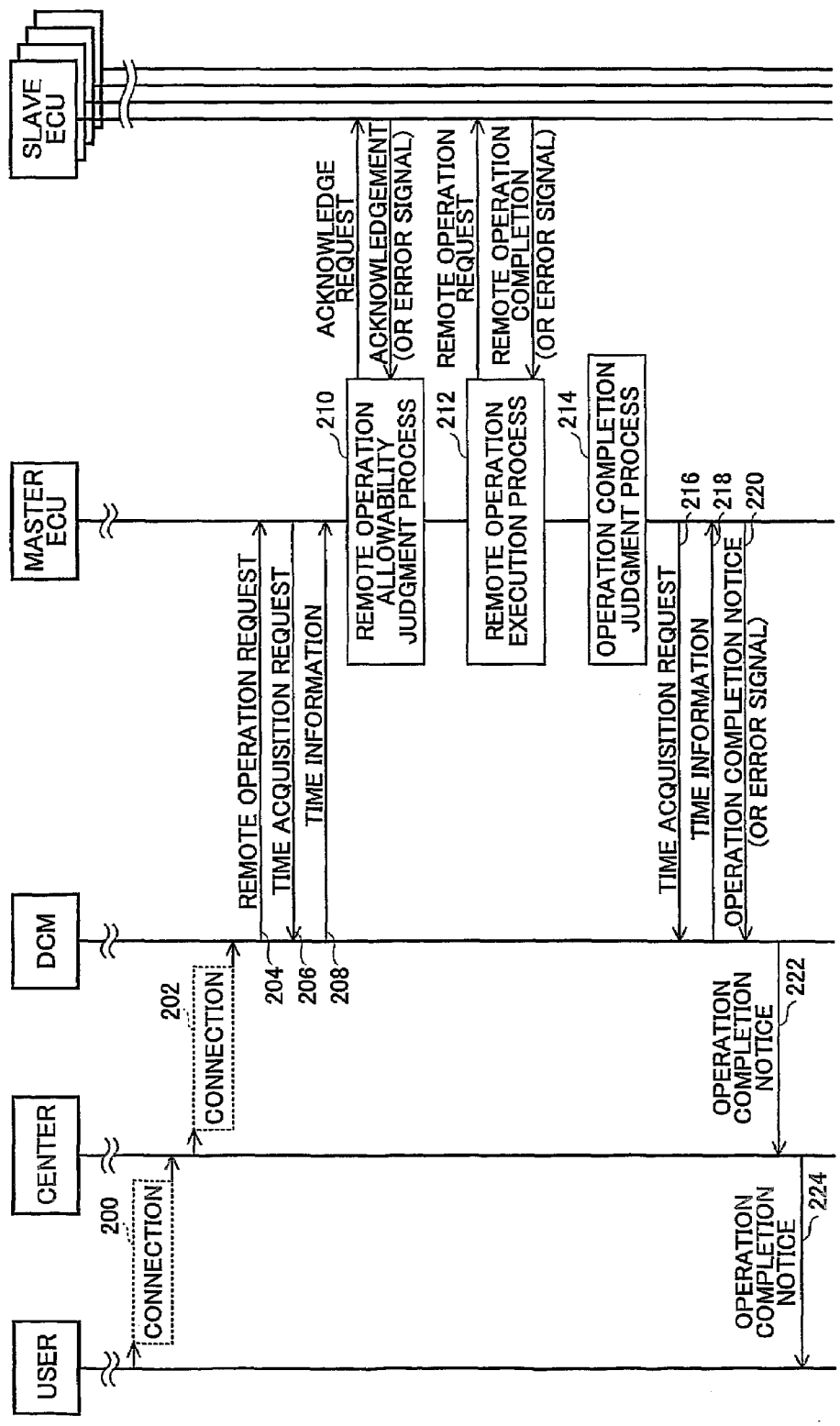
FIG. 2 is a flowchart for explaining the main routine performed by the remote operation control system of this embodiment.

Next, with reference to FIG. 2, operation of the remote operation control system of this embodiment will be explained. FIG. 2 is a flowchart for explaining the main routine performed by the remote operation control system of this embodiment.

In this remote operation control system, each of in-vehicle apparatus 20, portable terminal 22, and the center 24 has a program for realizing the function described below stored in the ROM respectively, and is operates according to the program. The program can be recorded on a computer-readable recording medium such as a CD, DVD, a hard disk, etc.

In the remote operation control system of this embodiment, when an operation failure of in-vehicle apparatus is spontaneously notified or from the center 24 via portable terminal 22 to the vehicle user at a place distant from the vehicle and the vehicle user desires to make the blinking or turning off of the turn signal lamp, or to make the locking or unlocking of the vehicle door for theft prevention or for operation failure management, or to close completely or to some extent the window of the vehicle door from the open state the window of the vehicle door is opened for theft prevention or for operation failure management, the input output section of portable terminal 22 is operated and the web browser is started.

The center 24 stores the format which requests a remote operation needed for driving the in-vehicle device of in-vehicle apparatus 20 remotely in response to the operation of portable terminal 22.

If the predetermined operation is performed by the vehicle user in the state where the web browser is started, the portable terminal 22 establishes, according to the operation, the wireless communication connection via the center 24 and the communication network, and requests the center 24 to supply the web screen for requesting the remote operation which the center 24 has.

The center 24 supplies the portable terminal 22 with the web screen for requiring the remote operation according to the demand, if the demand from the portable terminal 22 is received.

The portable terminal 22 acquires the web screen for requiring the remote operation from the center 24 according to the above-mentioned processing.

The items of the remote operation which allow the remote operation to be performed by the operation of portable terminal 22 are provided in this web screen.

The portable terminal 22 specifies which of the in-vehicle devices is selected for the remote operation by the vehicle user based on the existence of the check in the check box provided for every item of the remote operation in which the remote operation is possible.

When the transmission request is sent after the check box in the web screen is checked with the operation according to the vehicle user, the portable terminal 22 transmits the remote operation demand information to the center 24 in order to notify that the remote operation of the in-vehicle device corresponding to the check is requested to the center 24 (step 200).

The portable terminal 22 terminates the connection of the wireless communication with the center 24 after the transmission is completed.

When the remote operation demand information transmitted from the portable terminal 22 is received at the center after the center 24 provides portable terminal 22 with the web screen for requiring the remote operation, the center establishes connection with the in-vehicle apparatus 20 of the vehicle corresponding to the portable terminal 22 through the communication network.

The remote operation demand signal which indicates that the remote operation of specific in-vehicle apparatus is demanded is transmitted to the in-vehicle apparatus 20 with the receipt time information on remote operation demand information by operation in portable terminal 22 (step 202).

The center 24 terminates the connection of the wireless communication with in-vehicle apparatus 20, after the transmission is completed.

When the remote operation demand signal transmitted from the center 24 is received, DCM 30 of in-vehicle apparatus 20 specifies the demand receipt time in in-vehicle apparatus and the center 24, and notifies master ECU 34 that the remote operation is demanded (step 204).

If master ECU 34 is notified from DCM 30 that the remote operation of in-vehicle apparatus is demanded, it will request what the information on current time should be transmitted for to DCM 30 (step 206).

And the in-vehicle apparatus to which the remote operation is demanded if master ECU 34 acquires the current time information transmitted from DCM 30 to the request to send of current time (step 208), the demand receipt time (the center receipt time is called hereafter) and the demand receipt time of acquired master ECU 34 in the center 24 (RS receipt time is called hereafter) are matched.

Next, master ECU 34 performs processing (remote operation allowability judgment processing) which judges whether the precondition for carrying out the remote operation first about the in-vehicle apparatus to which the remote operation is demanded actually is satisfied (step 210).

Specifically, slave ECU corresponding to the in-vehicle apparatus to which the remote operation is demanded is extracted from the table which specifies a combination of the in-vehicle apparatus and slave ECU which is provided for the checking of whether the precondition for carrying out the remote operation of in-vehicle apparatus is satisfied. And the signal (acknowledge request signal) which requests what it should be checked for whether a precondition is satisfied is transmitted to the extracted slave ECU of the controlled ECU group 36. Then, it is judged whether the signal (acknowledgement signal) which indicates the result of the checking in which the precondition is satisfied is received from all the slave ECUs corresponding to the in-vehicle apparatuses to which the remote operation is demanded.

The remote operation allowability judgment processing for each of the in-vehicle apparatuses will be explained in detail later.

As the decision result when it judges with all the preconditions for carrying out the remote operation of the in-vehicle apparatus to which the remote operation is demanded being satisfied, master ECU 34 performs the processing (remote operation execution process) which performs the remote operation of the in-vehicle apparatus to which the remote operation is demanded (step 212).

Specifically, master ECU 34 transmits the signal (operation demand signal) which requests what the remote operation of the in-vehicle apparatus should be carried out for to slave ECU which drives the in-vehicle apparatus to which the remote operation is demanded.

Slave ECU will perform processing for performing the remote operation of corresponding in-vehicle apparatus, if the operation demand signal from master ECU 34 is received.

On the other hand, when it is judged that any of the preconditions is not satisfied, master ECU 34 forbids execution of the remote operation of the in-vehicle apparatus, and does not perform transmission of an operation demand signal to slave ECU.

The remote operation execution processing for each of the in-vehicle apparatuses will be explained in detail later.

If master ECU 34 performs remote operation execution processing or the processing is forbidden after it performs remote operation allowability judgment processing about the remote operation of in-vehicle apparatus next, it will perform processing (remote operation completion judgment processing) which judges the completion existence of a remote operation (step 214).

Specifically when an operation demand signal is transmitted to slave ECU, The factor is specified, when it distinguishes whether the operation is normally completed based on the operation response about the remote operation transmitted after that from the slave ECU and the operation demand signal over slave ECU is not transmitted.

Master ECU 34 requests what the information on current time should be transmitted for to DCM 30, after ending remote operation completion judgment processing (step 216).

And if the current time information transmitted from DCM 30 to the request to send of current time is acquired (step 218), completion time will be specified and it will be notified to DCM 30 that it ended by that the remote operation is completed or un-completing (step 220).

When the operation about a remote operation terminates abnormally, without completing normally, the notice including the reason terminated abnormally is performed.

When the notice of remote operation completion transmitted from master ECU 34 is received, DCM 30 makes wireless communication connection via the center 24 and a communication network, and transmits that to the center 24 (step 222).

DCM 30 terminates the connection of the wireless communication with the center 24 after the transmission is completed.

When the notice of remote operation completion transmitted from DCM 30 of the vehicle is received, the center 24 makes wireless communication connection via portable terminal 22 and the communication network corresponding to the vehicle, and transmits that to the portable terminal 22 (step 224).

The center 24 terminates the connection of the wireless communication with portable terminal 22 after the transmission is completed.

After portable terminal 22 requests the remote operation of in-vehicle apparatus, when the notice of remote operation completion transmitted from the center 24 is received, it makes a user recognize the result of the notice with a display or a sound.

Thus, in the remote operation control system of this embodiment, the remote operation of the in-vehicle apparatus carried in the vehicle is carried out by the vehicle user's operating portable terminal 22, and making a remote operation demand via the center 24 from portable terminal 22 to in-vehicle apparatus 20.

For this reason, even if the vehicle user has not got into the vehicle, he can make in-vehicle apparatus drive by operation of portable terminal 22 at the place distant from the vehicle.

Therefore, according to the system of this embodiment, the portable terminal 22 is operated when the vehicle user forgets the manual operation of in-vehicle apparatus in the vehicle, and it is possible to realize the remote operation of the in-vehicle apparatus and to make the in-vehicle apparatus by this shift to a desired state remotely.

In the remote operation control system of this embodiment, when the remote operation of specific in-vehicle apparatus is requested from the center 24, in-vehicle apparatus 20 performs remote control allowability judgment processing in which it is checked whether the precondition for carrying out the remote operation whether the vehicle is in the state where the remote operation may be carried out is satisfied. And only when the result of the checking is affirmative, the remote operation is actually performed.

Accordingly, when the vehicle is not in a suitable situation for performing the demanded remote operation of the in-vehicle apparatus, the remote operation of the in-vehicle apparatus is not operated. It is possible to secure the safety about the remote operation of the in-vehicle apparatus, and performing the unnecessary processing is avoided.

Next, with reference to FIG. 3 through FIG. 10, the remote operation allowability judgment processing and the remote operation execution processing for each of the in-vehicle apparatuses to which remote operation is demanded in the remote operation control system of this embodiment will be explained.

(1) Remote Control Allowability Judgment Processing Common to the Remote Operation of Each In-Vehicle Apparatus For the purpose of securing the safety of the vehicle, in the system of this embodiment, the remote operation of each in-vehicle apparatus is made valid only when all of the following preconditions (a) to (d) are satisfied: (a) a difference between the time (specifically RS receipt time) the vehicle received the remote operation demand from the center 24 and the time (specifically center receipt time) the center 24 received the remote operation demand from portable terminal 22 does not exceed a predetermined time (for example, 10 minutes); (b) the vehicle is not in an operating state; (c) the local operation is not performed immediately after the time (specifically center receipt time) the center 24 received the remote operation demand from portable terminal 22, or immediately after the time the portable terminal 22 sent the remote operation demand to the center 24 if possible; and (d) mutually contradictory remote operation demands are not received almost simultaneously. Otherwise, or when any of the preconditions (a) to (d) is not satisfied, the remote operation of each in-vehicle apparatus is made invalid.

The judgment of whether the precondition shown in the above-mentioned (a) is satisfied is carried out as follows. Master ECU 34 compares the RS receipt time with the center receipt time, and determines whether the difference is less than the predetermined time.

The judgment of whether the precondition shown in the above-mentioned (b) is satisfied is carried out as follows. Master ECU 34 detects the state of the ignition/starting switch of the vehicle and the state of the accessories switch, and determines whether the ignition/starting switch is in OFF and the accessories switch is in OFF.

The judgment of whether the precondition shown in the above-mentioned (c) is satisfied is carried out as follows. Master ECU 34 compares the request time according to the center receipt time or portable terminal 22 with the time the local operation related to the in-vehicle apparatus to which the remote operation is demanded is performed. And master ECU 34 determines whether the local operation is performed almost the same time as the time the remote operation is demanded.

When performing this judgment, it is necessary that master ECU 34 specifies the operation kind of the in-vehicle apparatus and the occurrence time of the local operation based on the information from each slave ECU, and every time the local operation is performed or after the remote operation demand is received from the center 24, an acknowledge request is notified to each slave ECU, and a response to the request is received from each slave ECU.

The judgment of whether the precondition shown in the above-mentioned (d) is satisfied is carried out as follows. Master ECU 34 determines whether the mutually contradictory remote operation demands (for example, a hazard blinking demand and a hazard turning-off demand) are received from the center 24 almost simultaneously.

(2) Hazard Blinking

Figure 3:
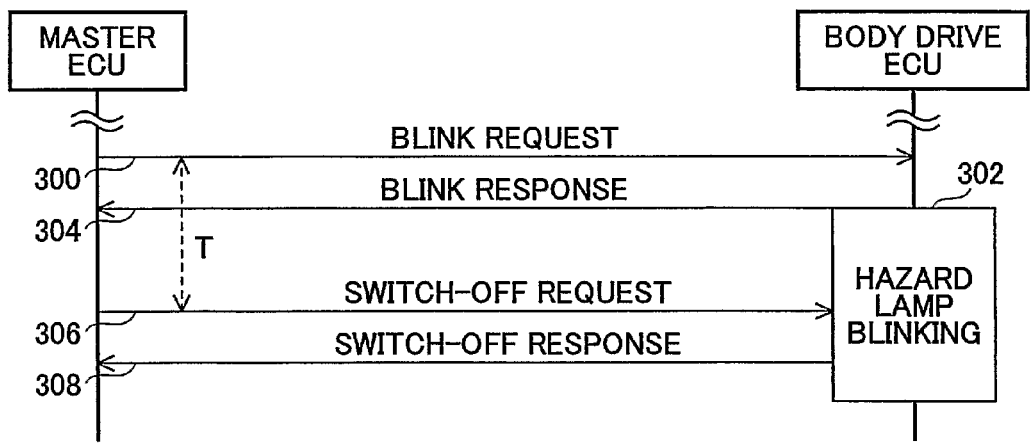
FIG. 3 is a flowchart for explaining the subroutine performed when the remote operation of the demanded in-vehicle apparatus is blinking of a turn signal lamp in the remote operation control system of this embodiment.

FIG. 3 is the flowchart for explaining the subroutine performed when the in-vehicle apparatus to which the remote operation is demanded is a turn signal lamp (hazard lamp) in the remote operation control system of this embodiment and the contents of the remote operation are turn signal lamp blinking.

The remote operation which blinks the turn signal lamp in the system of this embodiment is made valid when the preconditions shown in the above-mentioned (a) to (d) are satisfied and additionally the precondition that the turn signal lamp is actually turned off is satisfied. Otherwise (or when the turn signal lamp is blinking actually) it is made invalid. This is because it is not necessary to perform the remote operation when the turn signal lamp is blinking actually.

Master ECU 34 determines whether all the preconditions shown in the above-mentioned (a)-(d) are satisfied as the remote operation allowability judgment processing, and the acknowledge request signal which requests the checking of whether the state of the turn signal lamp is in the turning-off state is transmitted to body drive ECU 40 via the first bus 38.

At this time, the acknowledge request signal is transmitted by master ECU 34 through the first bus 38 with the identifier which specifies body drive ECU 40 which performs the acknowledge request among all the slave ECUs being included. And the acknowledge request signal with the identifier reaches body drive ECU 40.

If the acknowledge request signal which requests the checking of whether the state of the turn signal lamp is in the turning-off state is received from master ECU 34, body drive ECU 40 checks the state of the turn signal lamp based on the state of hazard switch 70, and sends the result of the checking to master ECU 34 as the response signal.

Master ECU 34 receives the response signal from the body drive ECU 40 after master ECU 34 transmits the acknowledge request signal which requests the checking of whether the state of the turn signal lamp is the turning-off state to body drive ECU 40. Only when it is determined that the result of the checking is the turning-off state of the turn signal lamp and that all the preconditions shown in the above-mentioned (a)-(d) are satisfied, master ECU 34 determines that all the preconditions for carrying out the remote operation of the blinking of the turn signal lamp are satisfied.

On the other hand, if it is determined that the result of the checking is the blinking of the turn signal lamp as a result of having received the response signal from body drive ECU 40, or if any of the preconditions shown in the above (a)-(d) is not satisfied, master ECU 34 determines that any of the preconditions for carrying out the remote operation of the blinking of the turn signal lamp is not satisfied.

If master ECU 34 judges that all of the above-mentioned preconditions are satisfied, master ECU 34 transmits the operation demand signal for changing the turn signal lamp to the blinking state from the turning-off state to body drive ECU 40 via the first bus 38 as the remote operation execution processing (step 300).

At this time, while the identifier which specifies body drive ECU 40, which should perform the demanded remote operation, among all the slave ECUs is included, the operation demand signal is transmitted by master ECU 34 through the first bus 38, and it reaches body drive ECU 40.

When the operation demand signal for blinking the turn signal lamp is received from master ECU 34, body drive ECU 40 turns on hazard flasher relay 70 and makes the right-and-left coincidence blinking of the turn signal lamps (step 302).

The operation response signal which indicates that the turn signal lamp is blinked is transmitted to master ECU 34 simultaneously (step 304).

Master ECU 34 transmits the operation demand signal for turning the turn signal lamp switch off to body drive ECU 40, when a predetermined time T passes after the operation demand signal for changing the turn signal lamp from the turning-off state to the blinking state is transmitted to body drive ECU 40 (step 306).

When the operation demand signal for turning the turn signal lamp off is received from master ECU 34, body drive ECU 40 turns off the hazard flasher relay 70, and turns off the turn signal lamp switch, and transmits the operation response signal indicating that the turn signal lamp switch is turned off, to master ECU 34 simultaneously (step 308).

Although it is not necessary to perform the remote turning off operation after the remote blinking operation, it is considered in many cases that the remote operation for blinking the turn signal lamp is carried out in order for the driver who is going to take the vehicle in the parking lot etc. to discover the parking position of the vehicle. For this reason, in order to prevent the continuation time of the blinking and the power consumption from increasing, performing the remote turning off operation is effective.

The time from a remote blinking demand to a remote turning-off demand may be adjustable in accordance with the intention of the vehicle user, and what is necessary in this case is just to transmit the remote operation demand united with the intention of the vehicle user, from the center 24.

On the other hand, if master ECU 34 determines that any of the above-mentioned preconditions is not satisfied, master ECU 34 forbids the remote operation execution processing, and the operation demand signal for blinking the turn signal lamp of body drive ECU 40 is not transmitted. The notice of remote operation completion which indicates that the remote blink operation is not completed normally is transmitted to the center 24 via DCM 30 with the reason thereof.

Also when the operation response signal which indicates that the blinking operation is performed is not received in a predetermined time after the operation demand signal for blinking the turn signal lamp is transmitted, master ECU 34 transmits the notice of remote operation completion which indicates that the remote blink operation is not completed normally to the center 24 via DCM 30 with the reason thereof.

On the other hand, when the operation response signal which indicates that the blinking operation is performed in the predetermined time is received after the operation demand signal for blinking the turn signal lamp is transmitted, the notice of remote operation completion which indicates that the remote blinking operation is completed normally is transmitted to the center 24 via DCM 30.

In the remote operation control system of this embodiment, if the remote operation for blinking the turn signal lamp is requested, the acknowledge request signal which requests the checking of whether the state of the turn signal lamp is in the turning-off state (or whether the precondition is satisfied) is sent from master ECU 34 to slave ECU (specifically body drive ECU 40). The execution of the remote operation is started and performed only when the result of the checking is affirmative.

(3) Hazard Lamp Turning Off

Figure 4:
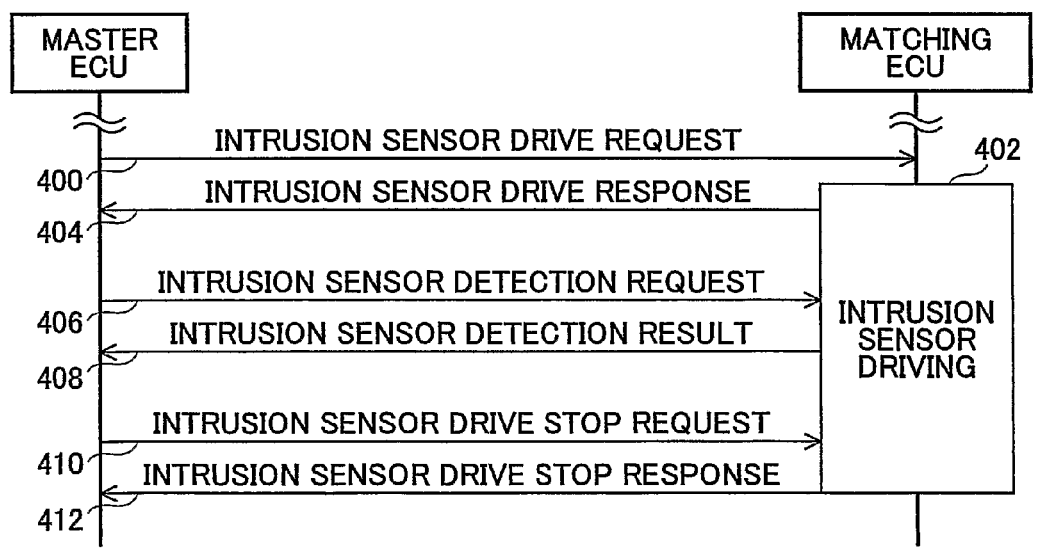
FIG. 4 is a flowchart for explaining the subroutine performed when the remote operation of the demanded in-vehicle apparatus is turning off of a turn signal lamp in the remote operation control system of this embodiment.
Figure 5:
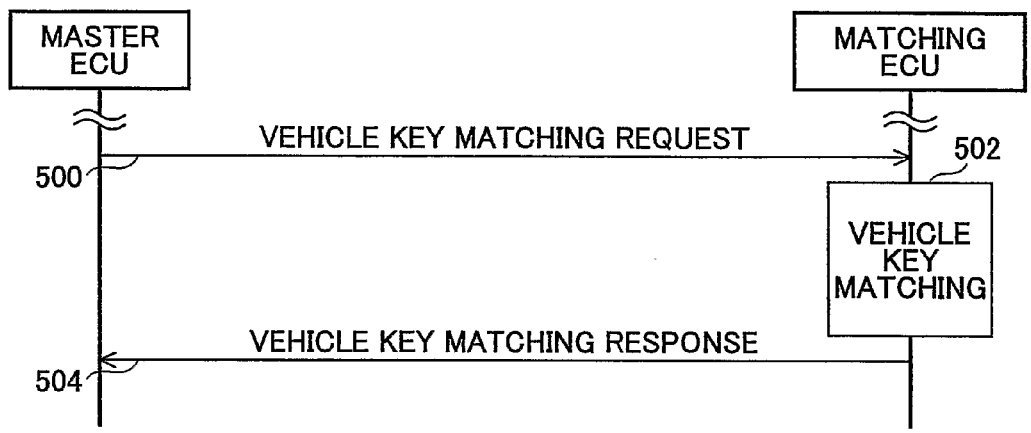
FIG. 5 is a flowchart for explaining the subroutine performed when the remote operation of the demanded in-vehicle apparatus is turning off of a turn signal lamp in the remote operation control system of this embodiment.
Figure 6:
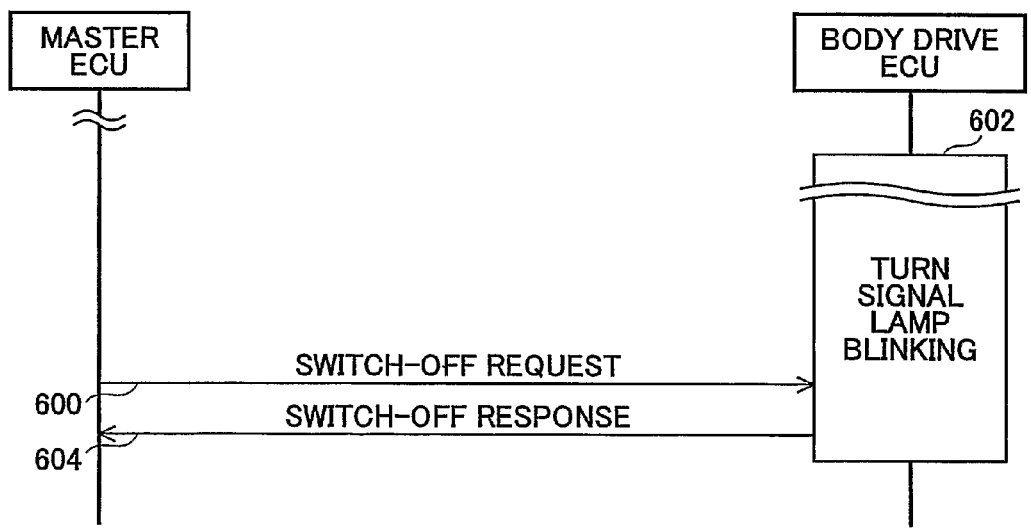
FIG. 6 is a flowchart for explaining the subroutine performed when the remote operation of the demanded in-vehicle apparatus is turning off of a turn signal lamp in the remote operation control system of this embodiment.

FIG. 4 through FIG. 6 are the flowcharts for explaining the subroutines performed when the in-vehicle apparatus, to which the remote operation is demanded is a turn signal lamp in the remote operation control system of this embodiment and the contents of the remote operation are turn signal lamp turning off.

The remote operation which turns the turn signal lamp switch off in the system of this embodiment is made valid when all the preconditions shown in the above-mentioned (a)-(d) are satisfied and in addition all the preconditions: (e) that the people do not exist in the passenger compartment, (f) that the vehicle key does not exist in the passenger compartment, and (g) the turn signal lamp is blinking actually are satisfied. Otherwise it is made (or when any of the precondition shown in (a)-(g) is not satisfied). This is because it is not necessary to perform the remote operation when the turn signal lamp is turned off actually.

Master ECU 34 determines whether all the preconditions shown in the above-mentioned (a)-(d) are satisfied as the remote operation allowability judgment processing. And the acknowledge request signal which requests the checking of whether the preconditions of (e) and (f) are satisfied is transmitted to matching ECU 50 via the first bus 38, and the acknowledge request signal which requests the checking of whether the state of the turn signal lamp is in the blinking state is transmitted to body drive ECU 40 via the first bus 38.

Specifically, master ECU 34 first supplies the drive signal which requests the intrusion sensor 90 to be driven in the active state in which the intrusion detection is possible, to matching ECU 50 via the first bus 38 (step 400).

If the driving of intrusion sensor 90 is requested from master ECU 34, matching ECU 50 drives the intrusion sensor 90 and sets the intrusion sensor 90 in the active state in which the intrusion detection is possible (step 402).

The response signal which indicates that the intrusion sensor 90 is driven is transmitted to master ECU 34 simultaneously (step 404).

Next, master ECU 34 requests that the detection result of intrusion sensor 90 should be notified to matching ECU 50 via the first bus 38, namely, the acknowledge request signal which requests the checking of whether the people do not exist in the passenger compartment is transmitted to matching ECU 50 via the first bus 38 (step 406).

If the notice of the detection result of intrusion sensor 90 is requested from master ECU 34, matching ECU 50 detects the existence of any person in the passenger compartment based on the output signal of the intrusion sensor 90, and sends the detection result to master ECU 34 as the response signal (step 408).

Master ECU 34 determines that the people do not exist in the passenger compartment as a result of the response of the detection result of intrusion sensor 90 received from matching ECU 50. In such a case, only when all the other preconditions are satisfied, master ECU 34 determines that all the preconditions for carrying out the remote operation of the turning off of the turn signal lamp are satisfied.

On the other hand, if it is determined that any person exists in the passenger compartment as a result of the response received from matching ECU 50, master ECU 34 determines that any of the preconditions for carrying out the remote operation of the turning off of the turn signal lamp is not satisfied.

After the response from matching ECU 50 is received, master ECU 34 supplies to matching ECU 50 via the first bus 38 the demand signal which requests that the driving of the intrusion sensor 90 be stopped and the intrusion sensor 90 be set in the inactive state in which the intrusion detection is impossible (step 410).

If the drive stopping of the intrusion sensor 90 is requested from master ECU 34, matching ECU 50 stops the driving of the intrusion sensor 90, and changes the intrusion sensor 90 in the inactive state in which the intrusion detection is impossible, and transmits the response signal which indicates that the driving of the intrusion sensor 90 is stopped to master ECU 34 simultaneously (step 412).

Master ECU 34 requests the checking of the vehicle key in the passenger compartment to matching ECU 50 via the first bus 38, namely, transmits the acknowledge request signal which requests the checking of whether the vehicle key does not exist in the passenger compartment to matching ECU 50 via the first bus 38 (step 500).

If the checking of the vehicle key in the passenger compartment is requested by master ECU 34, matching ECU 50 carries out the checking of whether the vehicle key exists in the passenger compartment by causing the transmitter 92 in the passenger compartment to transmit a request signal (step 502), and matching ECU 50 sends the matching result to master ECU 34 as the response signal (step 504).

If master ECU 34 determines that the vehicle key does not exist in the passenger compartment as a result of receiving the response of the checking result about the vehicle key in the passenger compartment from matching ECU 50, only when all the other preconditions are satisfied, master ECU 34 determines that all the preconditions for carrying out the remote operation of the turning off of the turn signal lamp are satisfied.

On the other hand, if it is determined that the vehicle key exists in the passenger compartment as a result of receiving the response from matching ECU 50, master ECU 34 determines that one of the preconditions for carrying out the remote operation of the turning off of the turn signal lamp is not satisfied.

If the acknowledge request signal which requests the checking of whether the state of the turn signal lamp is in the blinking state is received from master ECU 34, body drive ECU 40 checks the state of the turn signal lamp based on the state of hazard switch 70, and transmits the signal indicating the result of the checking to master ECU 34 as the response signal.

If master ECU 34 determines that the result of the checking is the blinking state of the turn signal lamp, as a result of receiving the response signal from the body drive ECU 40 after master ECU 34 transmits the acknowledge request signal which requests the checking of whether the state of the turn signal lamp is in the blinking state to the body drive ECU 40, master ECU 34 determines, only when all the other preconditions are satisfied, that all the preconditions for carrying out the remote operation of the turning off of the turn signal lamp are satisfied.

On the other hand, if it is determined that the result of the checking is the turning off state of the turn signal lamp as a result of receiving the response signal from the body drive ECU 40, master ECU 34 determines that one of the preconditions for carrying out the remote operation of the turning off of the turn signal lamp is not satisfied.

If master ECU 34 determines that all the above-mentioned preconditions of (a)-(g) are satisfied, then master ECU 34 transmits the operation demand signal for changing the turn signal lamp from the blinking state to the turning-off state, to the body drive ECU 40 via the first bus 38 as the remote operation execution processing (step 600).

When the operation demand signal for turning the turn signal lamp off is received from master ECU 34, the body drive ECU 40 turns off the hazard flasher relay 70, and turns off the turn signal lamp (step 602).

The operation response signal which indicates that the turn signal lamp is turned off is transmitted to master ECU 34 simultaneously (step 604).

On the other hand, when master ECU 34 determines that any of the above-mentioned preconditions of (a)-(g) is not satisfied, master ECU 34 forbids the remote operation execution processing and does not transmit the operation demand signal for turning off the turn signal lamp to the body drive ECU 40. The notice of remote operation completion which indicates that the remote turning-off operation is not completed normally is transmitted to the center 24 via DCM 30 with the reason thereof.

Also when the operation response signal which indicates that the turning off operation is performed is not received in predetermined time after the operation demand signal for turning off the turn signal lamp switch is transmitted, master ECU 34 transmits the notice of remote operation completion which indicates that the remote turning-off operation is not completed normally to the center 24 via DCM 30 with the reason thereof.

On the other hand, when the operation response signal which indicates that the turning off is performed in the predetermined time is received after the operation demand signal for turning off the turn signal lamp is transmitted, the notice of remote operation completion which indicates that the remote turning-off operation is completed normally is transmitted to the center 24 via DCM 30.

In the remote operation control system of this embodiment, if the remote operation for turning off the turn signal lamp switch off is requested, the acknowledge request signal which requests the checking of whether the preconditions that the people and the vehicle key do not exist in the passenger compartment and that the turn signal lamp is in the blinking state are satisfied is sent from master ECU 34 to slave ECU (specifically matching ECU 50). The execution of the remote operation is started and performed only when the result of the checking is affirmative.

(4) Door Locking

Figure 7:
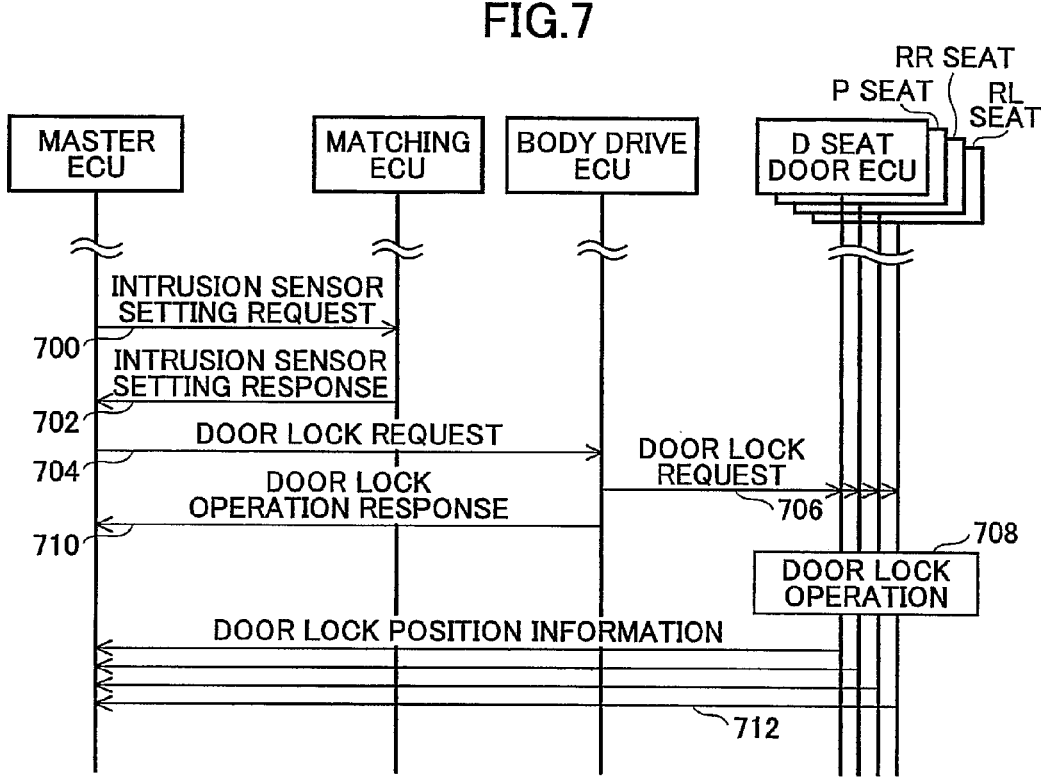
FIG. 7 is a flowchart for explaining the subroutine performed when the remote operation of the demanded in-vehicle apparatus is locking of a vehicle door in the remote operation control system of this embodiment.

FIG. 7 is the flowchart for explaining the subroutine performed when the in-vehicle apparatus to which the remote operation is demanded is a vehicle door in the remote operation control system of this embodiment and the contents of the remote operation are door locking.

The remote operation which locks the vehicle door in the system of this embodiment is made valid when all the preconditions shown in the above-mentioned (a)-(f) are satisfied and in addition when all the preconditions: (h) that all the vehicle doors are closed and (i) that any of the vehicle doors is unlocked are satisfied. Otherwise it is made invalid (or when any of these preconditions is not satisfied). This is because there is no implication which locks the vehicle door when the vehicle door is open, and it is not necessary to perform the remote operation to lock the vehicle doors when all the vehicle doors are locked actually.

Master ECU 34 determines whether all the preconditions shown in the above-mentioned (a)-(f) are satisfied as the remote operation allowability judgment processing. And the acknowledge request signal which requests the checking of whether the above-mentioned preconditions (h) and (i) are satisfied is transmitted to body drive ECU 40 via the first bus 38.

If the checking of whether the preconditions are satisfied is requested from master ECU 34, body drive ECU 40 transmits the acknowledge request signal which requests the checking to each of door ECUs 42-48 via the first bus 38.

If the acknowledge request signals which request the checking of whether all the vehicle doors are closed and the checking of whether any of the vehicle doors is unlocked are received from master ECU 34 through body drive ECU 40, each of door ECUs 42-48 checks the open/closed condition of the vehicle door based on the state of the courtesy lamp switch, and transmits to master ECU 34 the result of the checking as the response signal. And each of door ECUs 42-48 checks the lock position of the vehicle door based on the state of the corresponding one of door lock position switches 76, 80, 84 and 88, and transmits to master ECU 34 the result of the checking as the response signal.

Master ECU 34 determines that all the vehicle doors are closed and at least one of the vehicle doors is unlocked as a result of receiving the response signals from door ECUs 42-48 after the acknowledge request signals which request the checking of whether the preconditions (h) and (i) are satisfied are transmitted to body drive ECU 40. In such a case, only when all the preconditions shown in the above-mentioned (a)-(f) are satisfied, master ECU 34 determines that all the preconditions for carrying out the remote operation of the locking of all the vehicle doors are satisfied.

On the other hand, when it is determined that any of the vehicle doors is open or all the vehicle doors are locked as a result of receiving the response signals from door ECUs 42-48, or when any of the preconditions shown in the above-mentioned (a)-(f) is not satisfied, it is determined that one of the preconditions for carrying out the remote operation of the locking of all the vehicle doors is not satisfied.

If master ECU 34 determines that all the above-mentioned preconditions are satisfied, master ECU 34 transmits the demand signal which requests intrusion sensor 90 to be set to the active state in which the intrusion detection is possible, to matching ECU 50 via the first bus 38 as the remote operation execution processing (step 700).

If the setting of intrusion sensor 90 is requested from master ECU 34, matching ECU 50 drives the intrusion sensor 90 and sets the intrusion sensor 90 in the active state in which the intrusion detection is possible. And matching ECU 50 transmits simultaneously the response signal which indicates that the intrusion sensor 90 is driven, to master ECU 34 (step 702).

Master ECU 34 transmits the operation demand signal for locking the unlocked vehicle door to body drive ECU 40 via the first bus 38 (step 704).

If the door locking operation is requested from master ECU 34, body drive ECU 40 transmits the operation demand signal which requests that operation to door ECUs 42-48 via the first bus 38 (step 706). What is necessary in this case is just to transmit this operation demand signal to at least one of door ECUs 42-48 which control the actually unlocked vehicle door.

If the operation demand signal is received from master ECU 34 through body drive ECU 40, one of door ECUs 42-48 supplies the command signal for changing the unlocked vehicle door to the locked position to the corresponding one of door lock motors 74, 78, 82 and 86, and the unlocked vehicle door is locked (step 708).

Body drive ECU 40 transmits the notice of a response which indicates that the door lock is requested, to master ECU 34, after the operation demand signal for the door locking is transmitted to door ECUs 42-48 (step 710).

Door ECUs 42-48 transmit the information concerning the door lock position detected based on the state of the door lock position switch to master ECU 34, after the processing which locks the unlocked vehicle door is performed (step 712).

On the other hand, if master ECU 34 determines that any of the above-mentioned precondition is not satisfied, master ECU 34 forbids the remote control execution processing, and the operation demand signal for the door locking is not transmitted to the body drive ECU 40. The notice of remote operation completion which indicates that the remote lock operation is not completed normally is transmitted to the center 24 via DCM 30 with the reason thereof.

Also when the operation response signal which indicates that the door locking is performed is not received in a predetermined time after the operation demand signal for locking the vehicle door is transmitted, master ECU 34 transmits the notice of remote operation completion which indicates that the remote locking operation is not completed normally to the center 24 via DCM 30 with the reason thereof.

On the other hand, when the operation response signal which indicates that the door locking is performed is received in the predetermined time after the operation demand signal for the door locking is transmitted, the notice of remote operation completion which indicates that the remote lock operation is completed normally is transmitted to the center 24 via DCM 30.

In the remote operation control system of this embodiment, if the remote operation for locking the vehicle door is requested, the acknowledge request signals which request the checking of whether the preconditions that the people and the vehicle key do not exist in the passenger compartment and whether all the vehicle doors are closed and any of the vehicle doors is unlocked are satisfied are sent from master ECU 34 to slave ECU (specifically matching ECU 50 and door ECUs 42-48) via body drive ECU 40, if needed. The execution of the remote operation is started and performed only when the result of the checking is affirmative.

(5) Door Unlocking

Figure 8:
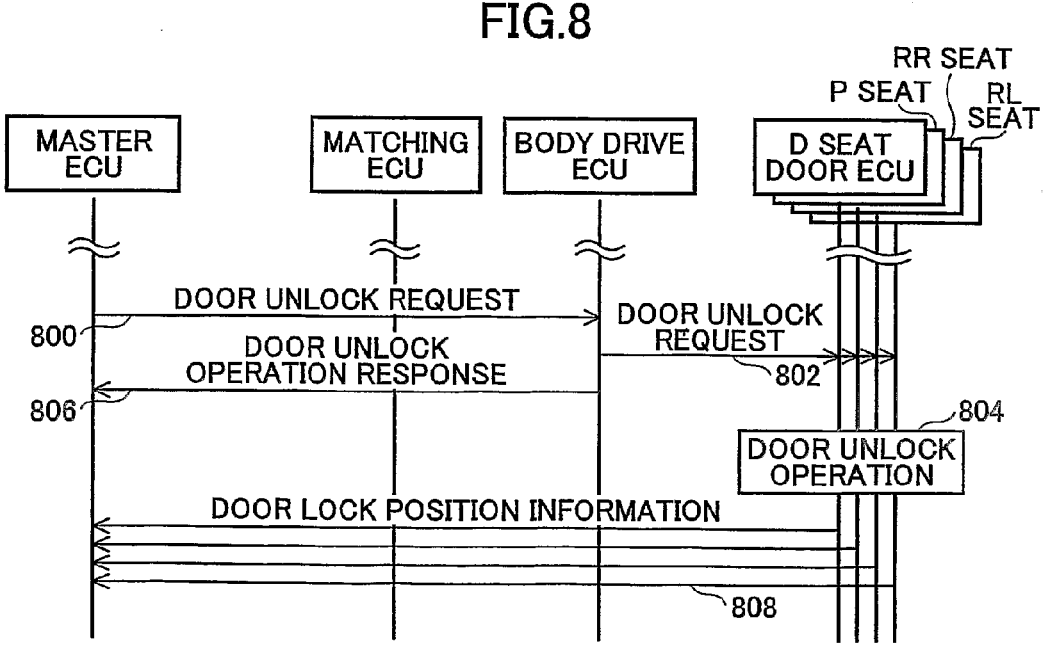
FIG. 8 is a flowchart for explaining the subroutine performed when the remote operation of the demanded in-vehicle apparatus is unlocking of a vehicle door in the remote operation control system of this embodiment.

FIG. 8 is the flowchart for explaining the subroutine performed when the in-vehicle apparatus to which the remote operation is demanded is a vehicle door in the remote operation control system of this embodiment and the contents of the remote operation are door unlocking (door lock cancellation).

In the system of this embodiment, the remote operation which makes the vehicle door unlock is made valid when the conditions shown in the above-mentioned (a)-(d) are satisfied and additionally the precondition that a predetermined time does not yet pass after the remote lock operation is performed is satisfied as shown in the above (4). Otherwise it is made invalid.

If master ECU 34 judges that all the above-mentioned preconditions are satisfied as a result of the remote operation allowability judgment processing, master ECU 34 transmits the operation demand signal for making the locked vehicle door unlocked to body drive ECU 40 via the first bus 38 as remote operation execution processing (step 800).

If the operation for door unlocking from master ECU 34 is requested of body drive ECU 40, it will transmit the operation demand signal which requests the operation from door ECUs 42-48 via the first bus 38 (step 802).

What is necessary is just to suppose that transmission of this operation demand signal is carried out to door ECUs 42-48 which control the vehicle door locked actually at least.

If the operation demand signal from master ECU 34 through body drive ECU 40 is received by door ECUs 42-48, each of door ECUs 42-48 supplies the command signal for changing the locked vehicle door to an unlocked state by door lock motors 74, 78, 82 and 86, so that the locked vehicle door is unlocked (step 804).

Body drive ECU 40 performs the notice of a response which indicates that the request of the door unlocking is canceled, to master ECU 34, after transmitting the operation demand signal for door unlocking to door ECUs 42-48 (step 806).

Door ECUs 42-48 will transmit the information on the door lock position detected based on the state of a door lock position switch to master ECU 34, if processing which makes the vehicle door locked unlock is performed (step 808).

On the other hand if master ECU 34 judges that any of the above-mentioned precondition is not satisfied, master ECU 32 inhibits the remote control execution processing and does not transmit the operation demand signal for door unlocking to body drive ECU 40. And master ECU 34 transmits the notice of remote operation completion which indicates that the remote unlocking operation is not completed normally to the center 24 via DCM 30 with the reason thereof thereof.

After transmitting an operation demand signal for master ECU 34 to make a vehicle door unlock, also when the operation response signal which indicates that the door unlocking is performed in predetermined time is not received, the notice of remote operation completion which indicates that the remote unlocking operation is not completed normally is transmitted to the center 24 via DCM 30 with the reason thereof.

On the other hand, when the operation response signal which indicates that the door unlocking is performed within the predetermined time is received after transmitting the operation demand signal for door unlocking, the notice of remote operation completion which indicates that the remote unlocking operation is completed normally is transmitted to the center 24 via DCM 30.

In the remote operation control system of this embodiment, if the remote operation which makes a vehicle door unlock is requested, only when the unlocking demand is received after the predetermined time passes since the remote lock operation is performed, the corresponding remote operation is performed so that the vehicle door is unlocked and the locked state is canceled.

(6) Door Window Closing

Figure 9:
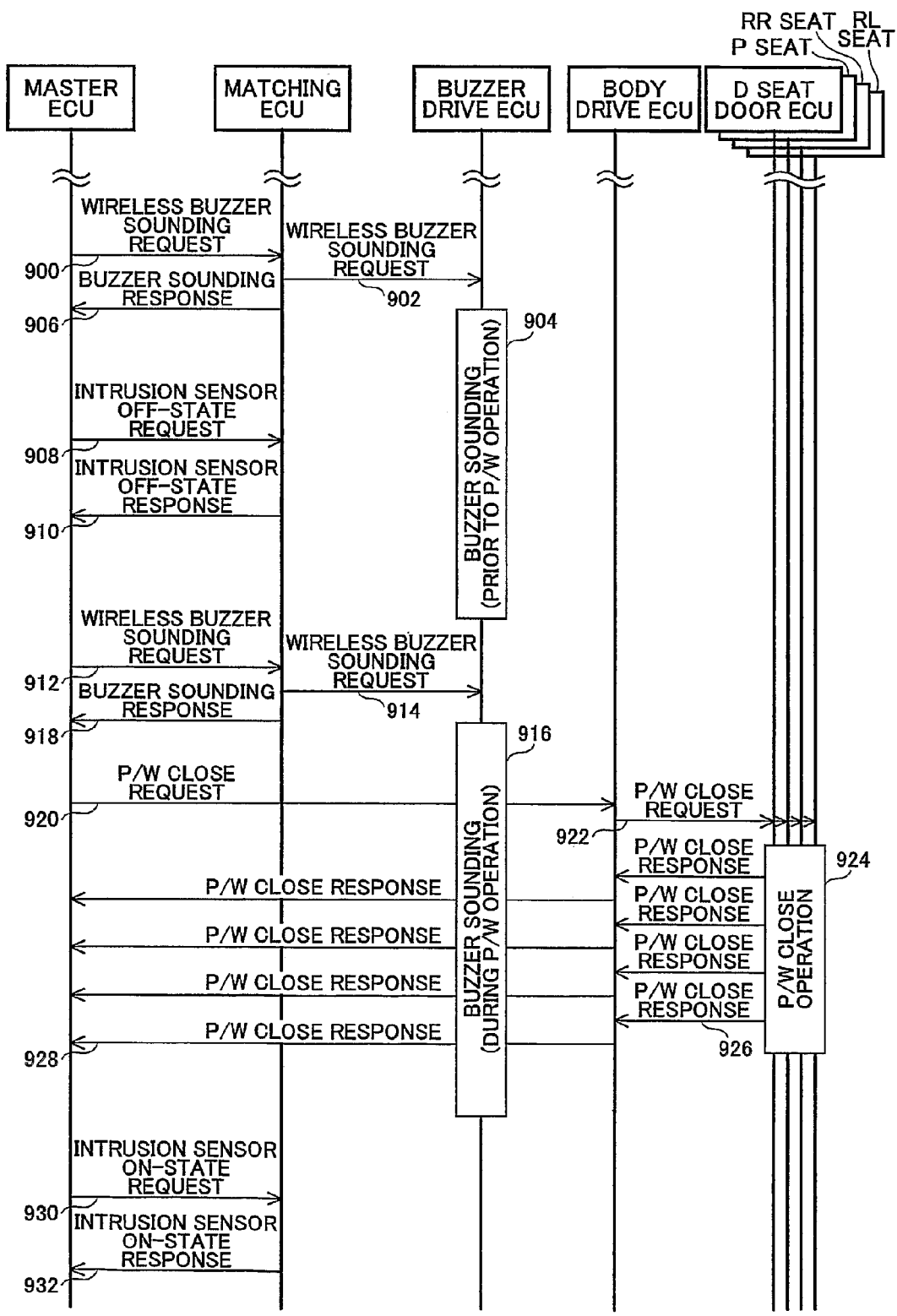
FIG. 9 is a flowchart for explaining the subroutine performed when the remote operation of the demanded in-vehicle apparatus is closing of a window in the remote operation control system of this embodiment.

FIG. 9 is the flowchart for explaining the subroutine performed when the in-vehicle apparatus to which the remote operation is demanded is a power window of a vehicle door, and the contents of the remote operation are door window closing in the remote operation control system of this embodiment.

In the system of this embodiment, the remote operation which closes the door window is made valid when the conditions shown in the above-mentioned (a) to (f) and (h) and additionally when (j) the precondition that none of the power windows of the vehicle doors is closed is satisfied. Otherwise it is made invalid.

This is because it is not necessary to perform the remote operation if all the power windows are closed.

Master ECU 34 transmits to body drive ECU 40 via the first bus 38 the acknowledge request signal which requests the checking of whether all the preconditions shown in the above-mentioned (a) to (f) and (h) are satisfied and whether the precondition of (j) described above is satisfied as remote operation allowability judgment processing.

If body drive ECU 40 receives the request for the checking of whether the precondition shown in (j) is satisfied from master ECU 34, body drive ECU 40 transmits the acknowledge request signal which requests the checking to each of door ECUs 42-48 via the first bus 38.

If each of door ECUs 42-48 receives the acknowledge request signal which requests the checking of whether the power window of which vehicle door is closed shown in (j) from master ECU 34 through body drive ECU 40, then the door ECU checks the open/closed condition of the door window and answers to master ECU 34 by sending the result of the checking of window opening or window closing as the response signal.

As a result of receiving the response signal from each of door ECUs 42-48 after the transmission of the acknowledge request signal of whether the precondition of (j) is satisfied to body drive ECU 40, if master ECU 34 determines that none of the power windows are closed, then it determines that all the preconditions for carrying out the remote operation of the power window closing are satisfied, only when all the preconditions shown in the above-mentioned (a)-(f) and (h) are satisfied.

On the other hand, if it is determined that all the power windows are closed or that any of the preconditions shown in the above mentioned (a)-(f) and (h) are not satisfied as a result of receiving the response signal from each of door ECUs 42-48, master ECU 34 determines that all the preconditions for carrying out the remote operation of the power window closing are not satisfied.

If master ECU 34 judges with all the above-mentioned preconditions being satisfied, the demand signal which first requests what wireless buzzer 96 should be sounded for according to a predetermined rule (for example, repetition by 2-second sounding and 2-second stop) to matching ECU 50 via the first bus 38 as remote operation execution processing is transmitted (step 900).

If sounding of wireless buzzer 96 is requested of matching ECU 50 from master ECU 34, it will transmit the signal which requests the sounding from buzzer drive ECU 52 via the first bus 38 (step 902).

Buzzer drive ECU 52 makes wireless buzzer 96 sound according to the rule, when the signal which requests sounding of wireless buzzer 96 from master ECU 34 through matching ECU 50 is received (step 904).

According to the sounding of this wireless buzzer 96, the person of the circumference of the car and a crew member in the car can be notified about a window being closed automatically in the future.

Matching ECU 50 will perform the notice of a response which indicates that the sounding of wireless buzzer 96 is requested, to master ECU 34, if the sounding demand to buzzer drive ECU 52 is transmitted (step 906).

Next, master ECU 34 transmits the demand signal which requests what intrusion sensor 90 should be canceled for to matching ECU 50 in the state in which the intrusion detection is impossible via the first bus 38 (step 908).

If cancellation of intrusion sensor 90 is requested of matching ECU 50 from master ECU 34, it will carry out the drive stop of the intrusion sensor 90, and will change it into the state in which the intrusion detection is impossible, and the response signal which indicates that the driving of intrusion sensor 90 is stopped and canceled is transmitted to master ECU 34 simultaneously (step 910).

Cancellation of this intrusion sensor 90 is performed in order to prevent that originate in vibration produced when a window carries out an open/close drive by PW motors 100-106, and intrusion sensor 90 carries out wrong detection.

It is appropriate also as lowering that sensitivity rather than canceling intrusion sensor 90 in the state in which the intrusion detection is impossible in this case.

Master ECU 34 if the response of having canceled intrusion sensor 90 from matching ECU 50 is received The demand signal which requests what wireless buzzer 96 should be sounded for according to a predetermined rule (for example, repetition by the different 0.5-second sounding and different 0.5-second stop from the rule in the above-mentioned step 900) to matching ECU 50 via the first bus 38 is transmitted (step 912).

If sounding of wireless buzzer 96 is requested of matching ECU 50 from master ECU 34, it will transmit the signal which requests the sounding from buzzer drive ECU 52 via the first bus 38 (step 914).

Buzzer drive ECU 52 makes wireless buzzer 96 sound according to the rule, when the signal which requests sounding of wireless buzzer 96 from master ECU 34 through matching ECU 50 is received (step 916).

According to the sounding of this wireless buzzer 96, the person of the circumference of the car and a crew member in the car can be notified about the window having closed automatically and operating.

Matching ECU 50 will perform the notice of a response which indicates that the sounding of wireless buzzer 96 is requested to master ECU 34, if the sounding demand to buzzer drive ECU 52 is transmitted (step 918).

Next, master ECU 34 transmits the operation demand signal for closing the window currently opened to body drive ECU 40 via the first bus 38 (step 920).

If the operation for window closed ᴝfrom master ECU 34 is requested of body drive ECU 40, it will transmit the operation demand signal which requests the operation from PW-ECU 60-66 via the second bus 54 (step 922).

PW-ECU 60-66 cause the window which opens a window to PW motors 100-106, and is supplying and opening the command signal for closing from a state and changing to a state closed, when the operation demand signal from master ECU 34 through body drive ECU 40 is received (step 924).

PW-ECU 60-66 will answer the processing result to body drive ECU 40, if processing which closes an open window is performed (step 926).

If the response result from the PW-ECU 60-66 is received after body drive ECU 40 points to the closed demand of a window to PW-ECU 60-66, it will transmit the operation response signal which indicates the result to master ECU 34 (step 928).

Master ECU 34 if the operation response signal from PW-ECU 60-66 through body drive ECU 40 is received, then, the demand signal which requests that the cancel state of intrusion sensor 90 should be canceled to matching ECU 50 via the first bus 38 is transmitted (step 930).

If cancellation release of intrusion sensor 90 is requested of matching ECU 50 from master ECU 34, it will cancel a drive stop of the intrusion sensor 90, and will change it into the state in which the intrusion detection is possible, and the response signal which indicates that the driving of intrusion sensor 90 is stopped and canceled is to transmitted to master ECU 34 simultaneously (step 932).

On the other hand, if master ECU 34 judges with it not being satisfied any of the above-mentioned precondition they are, it will forbid remote operation execution processing and will transmit the notice of remote operation completion which indicates that the remote window closing operation is not completed normally, to the center 24 via DCM 30 with the reason thereof.

After transmitting an operation demand signal for master ECU 34 to close a window, also when the operation response signal which indicates that the closed state is performed in predetermined time is not received, the notice of remote operation completion which indicates that the remote window closed operation is not completed normally is transmitted to the center 24 via DCM 30 with the reason thereof.

On the other hand, when the operation response signal which indicates that the closed state is performed in predetermined time is received after the operation demand signal for closing the window is sent, the notice of remote operation completion which indicates that the remote window closed operation is completed normally is transmitted to the center 24 via DCM 30.

In the remote operation control system of this point and this embodiment, if the remote operation which closes the power window of a vehicle door is requested from master ECU 34 via body drive ECU 40 if needed slave ECU (the precondition that a person and a vehicle key not existing in the passenger compartment to matching ECU 50 and door ECU 42-48) and all the vehicle doors having specifically closed and which window have not closed is satisfied that acknowledge request is performed and the remote operation which starts only when the check is able to be taken is performed.

(7) Door Window Opening

FIG. 9 is the flowchart for explaining the subroutine performed when the in-vehicle apparatus to which the remote operation is demanded is a power window of a vehicle door and the contents of the remote operation are door window opening (window closing cancellation) in the remote operation control system of this embodiment.

In the system of this embodiment, the remote operation which opens the door window is made valid when the conditions shown in the above-mentioned (a)-(d) and additionally when the precondition of being is satisfied before predetermined time passes, after the remote window closed operation shown above (6) is performed. Otherwise it is made invalid.

If master ECU 34 judges with all the above-mentioned preconditions being satisfied as a result of remote operation allowability judgment processing, the demand signal which first requests what wireless buzzer 96 should be sounded for according to a predetermined rule (for example, repetition by 2-second sounding and 2-second stop) to matching ECU 50 via the first bus 38 as remote operation execution processing is transmitted (step 1000).

If sounding of wireless buzzer 96 is requested of matching ECU 50 from master ECU 34, it will transmit the signal which requests the sounding from buzzer drive ECU 52 via the first bus 38 (step 1002).

Buzzer drive ECU 52 makes wireless buzzer 96 sound according to the rule, when the signal which requests sounding of wireless buzzer 96 from master ECU 34 through matching ECU 50 is received (step 1004).

According to the sounding of this wireless buzzer 96, the person of the circumference of the car and a crew member in the car can be notified about a window being opened wide automatically in the future.

Matching ECU 50 will perform the notice of a response which indicates that the sounding of wireless buzzer 96 is requested to master ECU 34, if the sounding demand to buzzer drive ECU 52 is transmitted (step 1006).

Next, master ECU 34 transmits the demand signal which requests what intrusion sensor 90 should be canceled for to matching ECU 50 in the state in which the intrusion detection is impossible via the first bus 38 (step 1008).

If cancellation of intrusion sensor 90 is requested of matching ECU 50 from master ECU 34, it will carry out the drive stop of the intrusion sensor 90, and will change it into the state in which the intrusion detection is impossible, and the response signal which indicates that the driving of the intrusion sensor 90 is stopped and canceled is transmitted to master ECU 34 simultaneously (step 1010).

Cancellation of this intrusion sensor 90 is performed in order to prevent that originate in vibration produced when a window carries out an open/close drive by PW motors 100-106, and intrusion sensor 90 carries out wrong detection.

It is appropriate also as lowering that sensitivity rather than canceling intrusion sensor 90 in the state in which the intrusion detection is impossible in this case.

Master ECU 34 if the response of having canceled intrusion sensor 90 from matching ECU 50 is received, the demand signal which requests what wireless buzzer 96 should be sounded for according to a predetermined rule (for example, repetition by the different 0.5-second sounding and different 0.5-second stop from the rule in the above-mentioned step 1000) to matching ECU 50 via the first bus 38 is transmitted (step 1012).

If sounding of wireless buzzer 96 is requested of matching ECU 50 from master ECU 34, it will transmit the signal which requests the sounding from buzzer drive ECU 52 via the first bus 38 (step 1014).

Buzzer drive ECU 52 makes wireless buzzer 96 sound according to the rule, when the signal which requests sounding of wireless buzzer 96 from master ECU 34 through matching ECU 50 is received (step 1016).

According to the sounding of this wireless buzzer 96, the person of the circumference of the car and a crew member in the car can be notified about the window carrying out the open operation automatically.

Matching ECU 50 will perform the notice of a response which indicates that the sounding of wireless buzzer 96 is requested to master ECU 34, if the sounding demand to buzzer drive ECU 52 is transmitted (step 1018).

Next, master ECU 34 transmits the operation demand signal for opening the window closed to body drive ECU 40 via the first bus 38 (step 1020).

If the operation for window opening from master ECU 34 is requested of body drive ECU 40, it will transmit the operation demand signal which requests the operation from PW-ECU 60-66 via the second bus 54 (step 1022).

PW-ECU 60-66 if the operate on demand signal from master ECU 34 through body drive ECU 40 is received, the command signal for closing a window on PW motors 100-106, opening from a state, and changing to a state is supplied, and a closed window is made to open wide (step 1024).

Since this remote window opening operation cancels the remote window closed operation performed immediately before, opening of this window is performed to the opening where the window is located and which is, before a remote window closed operation is performed.

PW-ECU 60-66 will answer the processing result to body drive ECU 40, if processing which opens a closed window is performed (step 1026).

If the response result from the PW-ECU 60-66 is received after body drive ECU 40 points to the release request of a window to PW-ECU 60-66, it will transmit the operation response signal which indicates the result to master ECU 34 (step 1028).

Master ECU 34 if the operation response signal from PW-ECU 60-66 through body drive ECU 40 is received, then the demand signal which requests that the cancel state of intrusion sensor 90 should be canceled to matching ECU 50 via the first bus 38 is transmitted (step 1030).

If cancellation release of intrusion sensor 90 is requested of matching ECU 50 from master ECU 34, it will cancel a drive stop of the intrusion sensor 90, and will change it into the state in which the intrusion detection is possible, and the response signal which indicates that the driving of intrusion sensor 90 is stopped and canceled is transmitted to master ECU 34 simultaneously (step 1032).

On the other hand, if master ECU 34 judges that any of the above-mentioned preconditions is not satisfied, master ECU 34 will forbid the remote operation execution processing and will transmit the notice of remote operation completion which indicates that the remote window opening operation is not completed normally to the center 24 via DCM 30 with the reason thereof.

After transmitting an operation demand signal for master ECU 34 to open a window, also when the operation response signal which indicates that the opening is performed in predetermined time is not received, the notice of remote operation completion which indicates that the remote window opening operation is not completed normally is transmitted to the center 24 via DCM 30 with the reason thereof.

On the other hand, when the operation response signal which indicates that the opening is performed in predetermined time is received after transmitting the operation demand signal for opening a window, the notice of remote operation completion which indicates that the remote window opening operation is completed normally is transmitted to the center 24 via DCM 30.

In the remote operation control system of this embodiment, the case where the release request will be performed in the predetermined time after remote window closing operation is performed if the remote operation which opens the power window of a vehicle door is requested this remote operation is performed, the power window of a vehicle door is opened wide, and the closed state is canceled. Thus, it sets to the remote operation control system of this embodiment.

If the remote operation of specific in-vehicle apparatus is requested from the center 24 by in-vehicle apparatus 20, what it should be checked for whether the precondition for carrying out the remote operation to slave ECU of the controlled ECU group 36 from master ECU 34 which is master ECU is satisfied will be requested.

And when it is checked that this precondition is satisfied based on the result of the checking of the precondition which answers the demand and each slave ECU transmits to master ECU 34, the remote operation of the in-vehicle apparatus is actually performed.

Therefore, when the vehicle performs the remote operation of the in-vehicle apparatus which is demanded but the vehicle is not in a suitable state therefor, e.g., when a person or a vehicle key exists in the passenger compartment in the state where the remote operation about turning off of a turn signal lamp or the lock of a vehicle door is demanded, when all the windows are closed in the state where the remote operation about a power window closing is demanded, the remote operation is not performed.

For this reason, since neither people nor a vehicle key is shut up in the passenger compartment, it is possible to raise the safety when carrying out the remote operation of the in-vehicle apparatus.

It is possible to avoid that the useless data for a remote operation does not flow into the bus between master ECU 34 and each slave ECU, and a remote operation is performed in an unnecessary situation.

In this embodiment, master ECU 34 has a table which specifies a combination of the in-vehicle apparatus and the slave ECU of the controlled ECU group 36 which is provided for the checking of whether the precondition for carrying out the remote operation corresponding to the in-vehicle apparatus to which the remote operation is carried out is satisfied.

For this reason, the remote operation demand signal sent from the center 24 to the in-vehicle apparatus 20, if the kind and the contents of the remote operation of the in-vehicle apparatus which is a candidate for a demand of a remote operation at least are included, processing in in-vehicle apparatus 20 can be performed appropriately.

It is not necessary to include the information on slave ECU which is provided for the checking of whether the precondition for carrying out that remote operation to this point and its remote operation demand signal is satisfied.

Therefore, according to the system of this embodiment, it is possible to ease the communication burden, when the communicating the information which indicates that the remote operation of in-vehicle apparatus is demanded of in-vehicle apparatus 20 from the center 24.

In this embodiment, one of the preconditions for carrying out the remote operation of the in-vehicle apparatus is that (a) the difference between the time (specifically RS receipt time) the vehicle received the remote operation demand from the center 24 and the time (specifically center receipt time) the center 24 received the remote operation demand from the portable terminal 22 does not exceed the predetermined time There is a case where the RS receipt time is significantly delayed from the center receipt time due to the communication delay in the radio transmission line between the center 24 and the in-vehicle apparatus 20. If the remote operation of the in-vehicle apparatus 20 is performed in such a situation, the in-vehicle apparatus is suddenly driven at an unexpected timing even through there is a possibility that the vehicle user is already inside or around the vehicle, which will cause the safety of the vehicle with respect to the remote operation to fall.

To solve the problem, according to this embodiment, the remote operation of the in-vehicle apparatus 20 is forbidden when the delay arises, and it is possible to prevent the remote operation of the in-vehicle apparatus from being performed at the unexpected timing due to the communication delay, and it is possible to secure the safety of the vehicle.

In this embodiment, one of the preconditions for carrying out the remote operation of the in-vehicle apparatus is that (c) the local operation is not performed immediately after the time (specifically center receipt time) the center 24 received the remote operation demand from the portable terminal 22 or after the time the portable terminal 22 sent the remote operation demand to the center 24 if possible.

When the local operation and the remote operation with respect to the same in-vehicle apparatus conflict almost at the same time, it is appropriate that priority is given to the local operation requested by the vehicle user who is inside the passenger compartment of the vehicle or in the vicinity of the vehicle, rather than the remote operation requested from a remote place distant from the vehicle, in order to give preference to the intention of the person who takes the vehicle or secure the safety of the vehicle.

Therefore, according to this embodiment, the remote operation is forbidden when the local operation and the remote operation with respect to the same in-vehicle apparatus conflict almost at the same period, and it is possible to prevent the remote operation from being performed unnecessarily and it is possible to give preference to the intention of the person who performed the local operation.

In this embodiment, if the remote operation of closing or opening of the power window of the vehicle door is requested, it is requested from master ECU 34 to matching ECU 50 and buzzer drive ECU 52, prior to performing the remote operation, that the intrusion sensor 90 be canceled and set to the state in which the detection is impossible, and that the wireless buzzer 96 be sounded. That is, the operation which sounds the operation and wireless buzzer 96 which cancel intrusion sensor 90 to a drive idle state as a precondition for carrying out remote window opening operation or a closed operation is requested. And when the intrusion sensor 90 is canceled for by the drive idle state by this operation demand is checked, and wireless buzzer 96 sounded is checked, the remote window opening operation or closing operation is performed.

Similarly, if the remote operation about the lock of a vehicle door is requested, before performing the remote operation, what intrusion sensor 90 should be set as the state in which the intrusion detection is possible for will be requested from master ECU 34 to matching ECU 50.

That is, the operation which sets intrusion sensor 90 as a driving state as a precondition for carrying out a remote lock operation is requested.

And when it is checked that intrusion sensor 90 had been set as the driving state by this operation demand, a remote lock operation is performed.

Thus, according to this embodiment, it is requested to perform a requested operation compulsorily and to satisfy a precondition, when performing remote window opening operation, a closed operation, or a remote lock operation.

In this case, a remote operation is forbidden, if a requested operation is performed compulsorily and a precondition is not satisfied.

Therefore, in spite of performing that according to this embodiment originate in execution of a remote operation and intrusion sensor 90 carries out wrong detection, and a remote operation, can avoid that wireless buzzer 96 does not sound, and it is possible to secure safety when performing the remote operation of in-vehicle apparatus etc.

By the way, the in-vehicle communication unit in the claims corresponds to DCM 30 in the above-mentioned embodiment, the in-vehicle electronic control unit in the claims corresponds to each of the slave ECUs of the controlled ECU group 36 in the above-mentioned embodiment, and each of the preliminary checking request unit, the remote driving unit, the time-out inhibition unit, the conflict inhibition unit and the compulsive operation request unit in the claims corresponds to master ECU 34 in the above-mentioned embodiment, respectively.

Moreover, the receiving step in the claims corresponds to the receiving of the remote operation demand signal from the center 24 by DCM 30 in the above-mentioned embodiment. The checking requesting step in the claims corresponds to, for example, the processing of step 406 in the subroutine of FIG. 4 and the processing of step 500 in the subroutine of FIG. 5 performed by master ECU 34.

Figure 10:
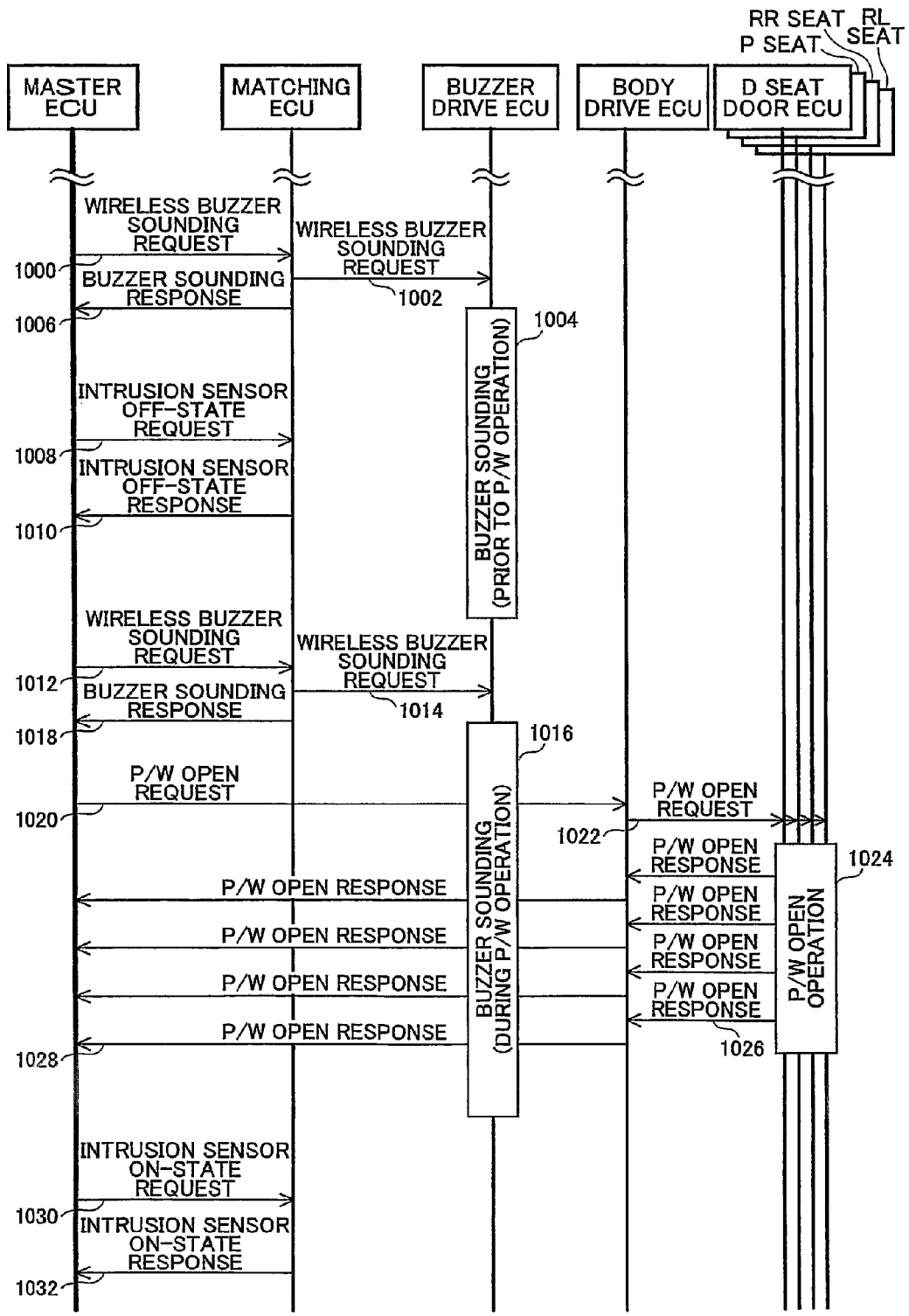
FIG. 10 is a flowchart for explaining the subroutine performed when the remote operation of the demanded in-vehicle apparatus is opening of a window in the remote operation control system of this embodiment.

Moreover, the operation requesting step in the claims corresponds to, for example, the processing of step 700 in the routine of FIG. 7, the processing of steps 900, 908 and 912 in the subroutine of FIG. 9 and the processing of steps 1000, 1008 and 1012 in the subroutine of FIG. 10 performed by master ECU 34. The remote operation step in the claims corresponds to the processing of steps 300, 600, 704, 800, 920 and 1020 in the drawings performed by master ECU 34.

In the above-mentioned embodiment, remote unlocking is to cancel remote locking, and remote window opening is to cancel remote window closing. Alternatively, these remote operations may be performed in a normal manner when the predetermined precondition is satisfied.

In the above-mentioned embodiment, the hazard blinking, the hazard turning off, the vehicle door locking, the vehicle door unlocking, the power window closing, and the power window opening are described as examples of the remote operation of in-vehicle apparatus. Additionally, it is also appropriate that opening and closing of a slide roof, a suitcase, a back door, etc., and turning on and off of an air-conditioner and an engine, which can be manually operated by the vehicle user, and lighting and turning off of a head lamp, a fog lamp, a small lamp, a room light, etc. are other examples of the remote operation of in-vehicle apparatus.

In the above-mentioned embodiment, when the remote demand of hazard turning off a door lock, or the window closing is carried out, the checking of whether a precondition is satisfied is requested from master ECU 34 to the plurality of slave ECUs (total number), but it is appropriate also as specifying the sequence of slave ECU which should collect acknowledgement by master ECU 34 to sequence of slave ECU, or master ECU 34 which should perform an acknowledge request on the table which master ECU 34 has beforehand.

For example, when the remote demand of the hazard turning off is carried out, it is asked to body drive ECU 40 whether the turn signal lamp is blinking.

It is appropriate also as asking matching ECU 50 whether when the precondition is satisfied next, people exist in the passenger compartment, and asking matching ECU 50 whether when the precondition is satisfied next, a vehicle key exists in the passenger compartment.

It is suitable for the sequence of slave ECU which should perform an acknowledge request from master ECU 34 in this case that each slave ECU is the long order of time requested to check whether a precondition is satisfied according to the acknowledge request from master ECU 34.

Since this is connected by first bus 38 where master ECU 34 and each slave ECU are single, it is necessary for master ECU 34 to transmit an acknowledge request signal to every one of a plurality of slave ECUs, but if an acknowledge request is made in the short order of the time which a check takes at random temporarily, it is because time delays about all the slave ECUs which the response from the long thing of the time which a check takes may be overdue, and should check a precondition in the processing for the check. This becomes an effective measure for shortening the processing time when checking whether all preconditions are satisfied as much as possible.

When the remote demand of the window closing is carried out in the above-mentioned embodiment, although the acknowledge request signal of whether a precondition is satisfied is transmitted to matching ECU 50 linked to the master ECU 34 to first bus 38, and PW-ECU 60-66 connected to the second bus 54 via body drive ECU 40, when there are a plurality of buses which those with a plurality of and its slave ECU connect, slave ECU which should check a precondition, it is appropriate also as arranging in parallel transmission of the acknowledge request signal from master ECU 34 to matching ECU 50, and transmission of the acknowledge request signal from body drive ECU 40 to each PW-ECU 60-66, and performing them.

It is not necessary to transmit an acknowledge request signal to master ECU 34 to matching ECU 50, and every one PW-ECU 60-66 in order, and, according to this composition, it becomes possible to shorten the processing time when checking whether all preconditions are satisfied.

When there are a plurality of buses which slave ECU connects in this way, it is appropriate also as transmitting an acknowledge request signal sequentially from slave ECU connected to one of buses.

Although the identifier which specifies the in-vehicle electronic control unit which should perform an acknowledge request in all the slave ECUs is given to the acknowledge request signal which requests the checking of whether the precondition which transmits to each slave ECU from master ECU 34 is satisfied in the above-mentioned embodiment, when there are a plurality of slave ECUs which should check a precondition, it is appropriate also as including the identifier of all slave ECU of them in the acknowledge request signal.

Since only slave ECU which slave ECU which does not need to check whether a precondition is satisfied or not should not perform confirming processing (transmission of the response signal is included), and should perform the check performs confirming processing according to this composition, it is possible to realize increase in efficiency of the confirming processing of a precondition, and intensive prevention of the communications traffic on the bus.

Since a plurality of slave ECUs which should check can start confirming processing simultaneously if it is multiplex communication, it becomes possible to aim at increase in efficiency of the confirming processing of a precondition, and intensive prevention of the communications traffic on the bus.

In the above-mentioned embodiment, after an acknowledge request signal is transmitted to each slave ECU from master ECU 34, all the response signals from each slave ECU are transmitted to master ECU 34, but now, there is a possibility that the communication traffic on the bus may concentrate.

On the other hand, the sequence of slave ECUs being checked is beforehand provided. Each slave ECU notifies the response result to downstream slave ECU when it is checked that the precondition is satisfied. The downstream slave ECU transmits the acknowledge signal indicating that its own precondition is satisfied to the next slave ECU when the acknowledge signal indicating that its own precondition is satisfied and the precondition is satisfied from upstream slave ECU is received.

And slave ECU of the end in which downstream slave ECU does not exist transmits acknowledgement of the purport that its own precondition is satisfied to master ECU 34, when acknowledgement of the purport that its own precondition is satisfied and the precondition is satisfied from upstream slave ECU is received.

According to this composition, it becomes possible to increase the efficiency of the confirmation processing of the precondition, and intensive prevention of the communication traffic on the bus for the information indicating that the precondition transmitted from each slave ECU is satisfied can be concentrated and can be transmitted to master ECU 34 at a time.

In the above-mentioned embodiment, DCM 30 which communicates with the center 24, and master ECU 34 which transmits an operation demand signal to each slave ECU so that the remote operation of the in-vehicle apparatus is carried out are used as separate units. Alternatively, DCM 30 and master 34 may be unified into one. In addition, in the above-mentioned embodiment, master ECU 34 and matching ECU 50 are used as separate units. Alternatively, master ECU 34 and matching ECU 50 may be unified into one.

The invention claimed is:

1. A remote operation control device comprising:
    an in-vehicle communication unit receiving a drive request signal which is transmitted from a center to request a remote operation of a predetermined in-vehicle apparatus;
    a preliminary checking request unit requesting, when the drive request signal from the center is received by the in-vehicle communication unit, an in-vehicle electronic control unit which controls operation of the in-vehicle apparatus, to perform checking of whether a precondition for carrying out the remote operation of the in-vehicle apparatus is satisfied; and
    a remote driving unit carrying out the remote operation of the in-vehicle apparatus when it is determined, after the drive request signal from the center is received by the in-vehicle communication unit, that the precondition is satisfied as a result of response to the request for the checking by the preliminary checking request unit, wherein the precondition includes at least a determination that a difference between a time the drive request signal from the center is received by the in-vehicle communication unit and a time a corresponding drive request signal from a portable terminal is received by the center is smaller than a predetermined time, and
    wherein when a remote operation request information is received from the portable terminal, the center transmits, to the in-vehicle apparatus, the remote operation request information with a center receipt time of the remote operation request information, and when the remote operation request information is received from the center, the in-vehicle apparatus acquires the center receipt time from the center.

2. The remote operation control device according to claim 1 wherein the remote driving unit is configured to carry out the remote operation of the in-vehicle apparatus when a notice indicating that the precondition is satisfied sent by the in-vehicle electronic control unit is received after the drive request signal from the center is received by the in-vehicle communication unit and the checking is requested by the preliminary checking request unit.

3. The remote operation control device according to claim 1 wherein the in-vehicle electronic control unit to which the checking is requested by the preliminary checking request unit includes an in-vehicle electronic control unit that is different from the in-vehicle electronic control unit which controls operation of the in-vehicle apparatus.

4. The remote operation control device according to claim 1 wherein the preliminary checking request unit is configured to request the checking to a plurality of in-vehicle electronic control units which control respective operations of predetermined in-vehicle apparatuses which are remotely controllable.

5. The remote operation control device according to claim 1 wherein the remote driving unit has a table which specifies a combination of the predetermined in-vehicle apparatus which is remotely controlled and an in-vehicle electronic control unit which is provided for the checking of whether the precondition is satisfied.

6. The remote operation control device according to claim 5 wherein, when a plurality of in-vehicle electronic control units which are provided for the checking of whether the precondition is satisfied prior to performing the remote operation of the predetermined in-vehicle apparatus exist, the table specifies either a sequence of performing the checking by the in-vehicle electronic control units or a sequence of collecting notices that the precondition is satisfied from the in-vehicle electronic control units.

7. The remote operation control device according to claim 1 wherein the remote driving unit is contained in the in-vehicle communication unit.

8. The remote operation control device according to claim 4 wherein the preliminary checking request unit is configured to transmit a checking request signal to the plurality of in-vehicle electronic control units in a sequence of the in-vehicle electronic control units depending on their lengths of a time needed for the checking of whether the precondition is satisfied.

9. The remote operation control device according to claim 4 wherein, when the plurality of in-vehicle electronic control units are connected to a plurality of buses, the preliminary checking request unit is configured to transmit a checking request signal to the in-vehicle electronic control units connected to the respective buses in parallel.

10. The remote operation control device according to claim 4 wherein, when the plurality of in-vehicle electronic control units are connected to either a first bus or a second bus, the preliminary checking request unit is configured to transmit a checking request signal to the in-vehicle electronic control units connected to one of the first and second buses earlier.

11. The remote operation control device according to claim 4 wherein a checking request signal which requests the checking to the plurality of in-vehicle electronic control units and is transmitted by the preliminary checking request unit contains identification information of all the in-vehicle electronic control units which are provided for the checking.

12. The remote operation control device according to claim 11 wherein each of the plurality of in-vehicle electronic control units is configured such that one in-vehicle electronic control unit transmits, when it is determined in response to the checking request signal from the preliminary checking request unit that the precondition with respect to the in-vehicle electronic control unit is satisfied and the other in-vehicle electronic control units are provided for receiving a notice indicating that the precondition with respect to the in-vehicle electronic control unit is satisfied, the notice to each of the other in-vehicle electronic control units respectively, or when none of the other in-vehicle electronic control units is provided for receiving the notice, the in-vehicle electronic control unit transmits the notice to the remote driving unit.

13. The remote operation control device according to claim 1 further comprising a time-out inhibition unit which inhibits the preliminary checking request unit from requesting the checking and inhibits the remote driving unit from carrying out the remote operation of the in-vehicle apparatus when a difference between a time the drive request signal from the center is received by the in-vehicle communication unit and a time the drive request signal is transmitted by the center exceeds a predetermined time.

14. The remote operation control device according to claim 1 further comprising a conflict inhibition unit which inhibits the remote driving unit from carrying out the remote operation of the in-vehicle apparatus when contents of the drive request signal from the center received by the in-vehicle communication unit conflict with contents of a local operation on a vehicle directly performed on a vehicle by a vehicle operator.

15. A remote operation control device comprising:
an in-vehicle communication unit receiving a drive request signal which is transmitted from a center to request a remote operation of a predetermined in-vehicle apparatus;
a compulsive operation request unit requesting, when the drive request signal from the center is received by the in-vehicle communication unit, an in-vehicle electronic control unit which controls operation of the in-vehicle apparatus to perform an operation needed to satisfy a precondition for carrying out the remote operation of the in-vehicle apparatus; and
a remote driving unit carrying out the remote operation of the in-vehicle apparatus when it is determined, after the drive request signal from the center is received by the in-vehicle communication unit, that the precondition is satisfied as a result of response to the request for the operation by the compulsive operation request unit, wherein the precondition includes at least a determination that a difference between a time the drive request signal from the center is received by the in-vehicle communication unit and a time a corresponding drive request signal from a portable terminal is received by the center is smaller than a predetermined time, and
wherein when a remote operation request information is received from the portable terminal, the center transmits, to the in-vehicle apparatus, the remote operation request information with a center receipt time of the remote operation request information, and when the remote operation request information is received from the center, the in-vehicle apparatus acquires the center receipt time from the center.

16. A remote operation control method comprising the steps of:
receiving a drive request signal which is transmitted from a center to request a remote operation of a predetermined in-vehicle apparatus;
requesting, when the drive request signal from the center is received in the receiving step, an in-vehicle electronic control unit which controls operation of the in-vehicle apparatus, to perform checking of whether a precondition for carrying out the remote operation of the in-vehicle apparatus is satisfied; and carrying out the remote operation of the in-vehicle apparatus when it is determined, after the drive request signal from the center is received in the receiving step, that the precondition is satisfied as a result of response to the request for the checking in the requesting step, wherein the precondition includes at least a determination that a difference between a time the drive request signal from the center is received by the in-vehicle communication unit and a time a corresponding drive request signal from a portable terminal is received by the center is smaller than a predetermined time, and wherein when a remote operation request information is received from the portable terminal, the center transmits, to the in-vehicle apparatus, the remote operation request information with a center receipt time of the remote operation request information, and when the remote operation request information is received from the center, the in-vehicle apparatus acquires the center receipt time from the center.

17. A remote operation control method comprising the steps of:

receiving a drive request signal which is transmitted from a center to request a remote operation of a predetermined in-vehicle apparatus;

requesting, when the drive request signal from the center is received in the receiving step, an in-vehicle electronic control unit which controls operation of the in-vehicle apparatus to perform an operation needed to satisfy a precondition for carrying out the remote operation of the in-vehicle apparatus; and carrying out the remote operation of the in-vehicle apparatus when it is determined, after the drive request signal from the center is received in the receiving step, that the precondition is satisfied as a result of response to the request for the operation in the requesting step, wherein the precondition includes at least a determination that a difference between a time the drive request signal from the center is received by the in-vehicle communication unit and a time a corresponding drive request signal from a portable terminal is received by the center is smaller than a predetermined time, and wherein when a remote operation request information is received from the portable terminal, the center transmits, to the in-vehicle apparatus, the remote operation request information with a center receipt time of the remote operation request information, and when the remote operation request information is received from the center, the in-vehicle apparatus acquires the center receipt time from the center.

18. The remote operation control device according to claim 1, wherein the precondition includes a determination that any persons do not exist in a passenger compartment of the vehicle and a vehicle key does not exist in the passenger compartment, and wherein the remote operation of the in-vehicle apparatus carried out by the remote driving unit includes a hazard lamp turning off, a vehicle door locking and a door window closing.

* * * * *